(12) United States Patent
Suzuki

(10) Patent No.: US 8,194,746 B2
(45) Date of Patent: Jun. 5, 2012

(54) MOVING PICTURE SIGNAL CODING METHOD, DECODING METHOD, CODING APPARATUS, AND DECODING APPARATUS

(75) Inventor: Yoshinori Suzuki, Saitama (JP)

(73) Assignee: Hitachi, Ltd., Tokyo (JP)

( * ) Notice: Subject to any disclaimer, the term of this patent is extended or adjusted under 35 U.S.C. 154(b) by 1122 days.

(21) Appl. No.: 12/073,757

(22) Filed: Mar. 10, 2008

(65) Prior Publication Data

US 2008/0310511 A1    Dec. 18, 2008

Related U.S. Application Data

(62) Division of application No. 10/488,030, filed as application No. PCT/JP03/00664 on Jan. 24, 2003.

(30) Foreign Application Priority Data

| Jan. 24, 2002 | (JP) | 2002-014974 |
| Feb. 14, 2002 | (JP) | 2002-036130 |
| Mar. 29, 2002 | (JP) | 2002-093541 |
| Sep. 13, 2002 | (JP) | 2002-267555 |
| Nov. 14, 2002 | (JP) | 2002-330209 |

(51) Int. Cl.
  *H04N 7/12* (2006.01)
  *H04N 11/02* (2006.01)
  *H04N 11/04* (2006.01)

(52) U.S. Cl. ......... 375/240.16; 375/240.12; 375/240.13; 375/240.14; 375/240.15

(58) Field of Classification Search . 375/240.12–240.16
See application file for complete search history.

(56) References Cited

U.S. PATENT DOCUMENTS

| 5,428,396 | A | 6/1995 | Yagasaki et al. |
| 6,128,342 | A | 10/2000 | Kikuchi et al. |
| 6,205,176 | B1 * | 3/2001 | Sugiyama ............... 375/240.12 |
| 2002/0034250 | A1 | 3/2002 | Yoo |
| 2003/0021344 | A1 | 1/2003 | Panusopone et al. |
| 2003/0112864 | A1 | 6/2003 | Karczewicz et al. |

(Continued)

FOREIGN PATENT DOCUMENTS

EP    0 895 425 A2    2/1999

(Continued)

OTHER PUBLICATIONS

Ian H. Witten et al., "Arithmetic Coding for Data Compression", Communications of the ACM, vol. 30, No. 6 (Jun. 1987), pp. 520-540.

(Continued)

*Primary Examiner* — Christopher S Kelley
*Assistant Examiner* — Chikaodili E Anyikire
(74) *Attorney, Agent, or Firm* — Stites & Harbison, PLLC; Juan Carlos A. Marquez Esq

(57) ABSTRACT

Moving picture motion compensation coding/decoding predicts a motion vector in a coding block from a motion vector of the adjacent position and codes a differential motion vector calculated from the motion vector to be coded and its prediction motion vector. The coding is performed by switching the coding accuracy between a coding accuracy of the differential motion vector (1) and a coding accuracy of the prediction motion vector and the coding motion vector (2) for each block. Moreover, when decoding the motion vector from the differential motion vector coded by the aforementioned coding, a reversed processing with respect to the coding is performed.

1 Claim, 29 Drawing Sheets

U.S. PATENT DOCUMENTS

2003/0128762 A1* 7/2003 Nakagawa et al. ...... 375/240.16
2004/0151245 A1 8/2004 Lainema et al.

FOREIGN PATENT DOCUMENTS

EP 0 895 425 A3 2/1999
JP 11-46364 7/1997

OTHER PUBLICATIONS

Ribas-Corbera Jordi, et al., "Optimizing Block Size in Motion-Compensated Video Coding", Journal of Electronic Imaging, vol. 7, No. 1, Jan. 1, 1998, pp. 1017-9909.

Ribas-Corbera Jordi, et al., "Optimal Motion Vector Accuracy for Block-Based Motion-Compensated Video Coders", Proceedings of the SPIE—The International Society for Optical Engineering, vol. 2668, Jan. 1, 1996, pp. 302-314.

Bjontegaard Gisle, "H.26L Test Model Long Term No. 1 (TML-2) draft 0", ITU Study Group 16—Video Coding Experts Group, No. Q15-1-57d0, Oct. 19-22, 1999, pp. 1-24.

Shen J., Ribas-Cordera Jordi, "Adaptive Motion Accuracy (AMA) in Telenor's Proposal", ITU Study Group 16—Video Coding Experts Group, No. Q15-H-20, Aug. 3-6, 1999, pp. 1-15.

Ribas-Corbera Jordi et al., "Optimizing Motion-Vector Accuracy in Block-Based Video Coding", IEEE Transactions on Circuits and Systems for Video Technology, vol. 11, No. 4, Apr. 1, 2001, the whole document.

"MPEG Video Compression Standard", Motion Compensation, Chapter 11, pp. 237-262.

Supplementary European Search Report for 03703048.3-1247/1469682, Dec. 30, 2009.

* cited by examiner

Fig.7
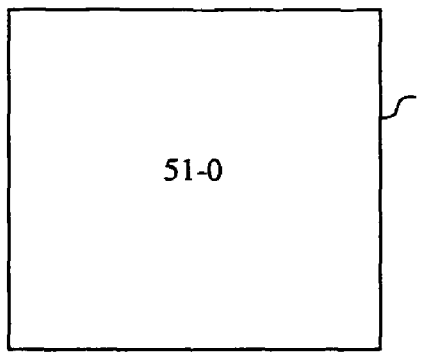
Mode 1 (16 × 16)
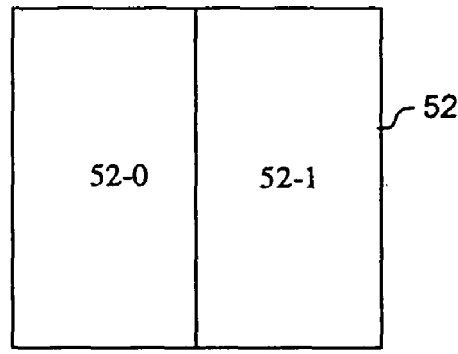
Mode 2 (16 × 8)
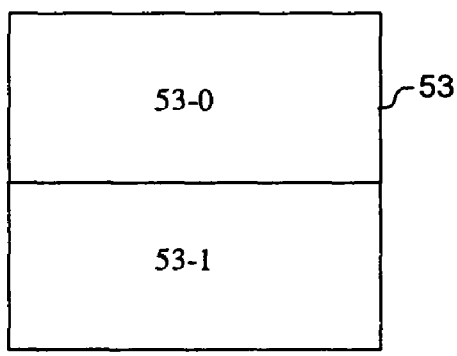
Mode 3 (8 × 16)
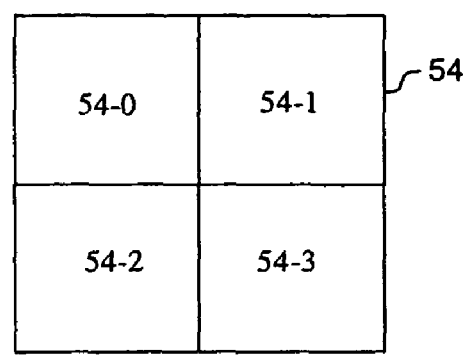
Mode 4 (8 × 8)
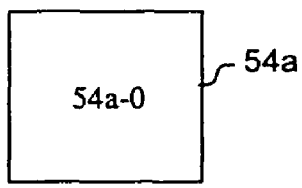
8x8 Partition 1 (8 × 8)
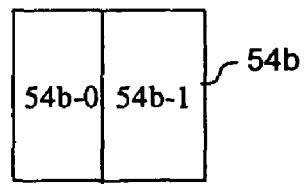
8x8 Partition 2 (8 × 4)
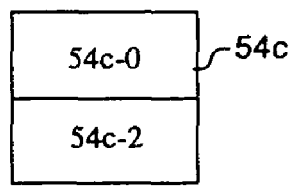
8x8 Partition 3 (4 × 8)
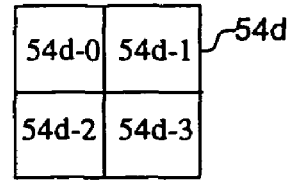
8x8 Partition 4 (4 × 4)

| MV ACCURACY | SHIFT VALUE (mv_shift) | CODE | |
|---|---|---|---|
| 1/4 | 0 | 1 | 81 |
| 1/2 | 1 | 001 | |
| 1 | 2 | 011 | |

| MV ACCURACY | SHIFT VALUE (mv_shift) | CODE | |
|---|---|---|---|
| 1/8 | 0 | 1 | 82 |
| 1/4 | 1 | 001 | |
| 1/2 | 2 | 011 | |
| 1 | 3 | 00001 | |

| Code_number | Macroblock mode |
|---|---|
| 0 | SKIP |
| 1 | 16 × 16 (mv_shift = 0) |
| 2 | 16 × 8 (mv_shift = 0) |
| 3 | 8 × 16 (mv_shift = 0) |
| 4 | 8 × 8 (split, mv_shift = 0) |
| 5 | 8 × 8 (split, mv_shift = 1) |
| 6 | 8 × 8 (split, mv_shift = 2) |
| 7 | Intra 4 × 4 |
| 8 | Intra 16 × 16 |

91

| Code_number | 8 × 8 Partition mode |
|---|---|
| 0 | 8 × 8 |
| 1 | 8 × 4 |
| 2 | 4 × 8 |
| 3 | 4 × 4 |
| 4 | Intra |

| Code_number | Macroblock mode | Block 1 | Block 2 |
|---|---|---|---|
| 0 | Direct | - | - |
| 1 | 16 × 16 (mv_shift = 0) | Forward | - |
| 2 | 16 × 16 (mv_shift = 0) | Backward | - |
| 3 | 16 × 16 (mv_shift = 0) | Bidirect | - |
| 4 | 16 × 8 (mv_shift = 0) | Forward | Forward |
| 5 | 8 × 16 (mv_shift = 0) | Forward | Forward |
| 6 | 16 × 8 (mv_shift = 0) | Backward | Backward |
| 7 | 8 × 16 (mv_shift = 0) | Backward | Backward |
| 8 | 16 × 8 (mv_shift = 0) | Forward | Backward |
| 9 | 8 × 16 (mv_shift = 0) | Forward | Backward |
| 10 | 16 × 8 (mv_shift = 0) | Backward | Forward |
| 11 | 8 × 16 (mv_shift = 0) | Backward | Forward |
| 12 | 16 × 8 (mv_shift = 0) | Forward | Bidirect |
| 13 | 8 × 16 (mv_shift = 0) | Forward | Bidirect |
| 14 | 16 × 8 (mv_shift = 0) | Backward | Bidirect |
| 15 | 8 × 16 (mv_shift = 0) | Backward | Bidirect |
| 16 | 16 × 8 (mv_shift = 0) | Bidirect | Forward |
| 17 | 8 × 16 (mv_shift = 0) | Bidirect | Forward |
| 18 | 16 × 8 (mv_shift = 0) | Bidirect | Backward |
| 19 | 8 × 16 (mv_shift = 0) | Bidirect | Backward |
| 20 | 16 × 8 (mv_shift = 0) | Bidirect | Bidirect |
| 21 | 8 × 16 (mv_shift = 0) | Bidirect | Bidirect |
| 22 | 8 × 8 (split, mv_shift=0) | | |
| 23 | 8 × 8 (split, mv_shift=1) | | |
| 24 | 8 × 8 (split, mv_shift=2) | | |
| 25 | Intra 4 × 4 | | |
| 26 | Intra 16 × 16 | | |

| Code_number | 8 × 8 Partition mode | Prediction |
|---|---|---|
| 0 | Direct | - |
| 1 | 8 × 8 | Forward |
| 2 | 8 × 8 | Backward |
| 3 | 8 × 8 | Bidirect |
| 4 | 8 × 4 | Forward |
| 5 | 4 × 8 | Forward |
| 6 | 8 × 4 | Backward |
| 7 | 4 × 8 | Backward |
| 8 | 8 × 4 | Bidirect |
| 9 | 4 × 8 | Bidirect |
| 10 | 4 × 4 | Forward |
| 11 | 4 × 4 | Backward |
| 12 | 4 × 4 | Bidirect |
| 13 | Intra | - |

Fig. 15

| Code_number | Macroblock mode |
|---|---|
| 0 | SKIP |
| 1 | 16 × 16 |
| 2 | 16 × 8 |
| 3 | 8 × 16 |
| 4 | 8 × 8 (split) |
| 5 | Intra 4 × 4 |
| 6 | Intra 16 × 16 |

| Code_number | Macroblock mode | Block 1 | Block 2 |
|---|---|---|---|
| 0 | Direct | - | - |
| 1 | 16 × 16 | Forward | - |
| 2 | 16 × 16 | Backward | - |
| 3 | 16 × 16 | Bidirect | - |
| 4 | 16 × 8 | Forward | Forward |
| 5 | 8 × 16 | Forward | Forward |
| 6 | 16 × 8 | Backward | Backward |
| 7 | 8 × 16 | Backward | Backward |
| 8 | 16 × 8 | Forward | Backward |
| 9 | 8 × 16 | Forward | Backward |
| 10 | 16 × 8 | Backward | Forward |
| 11 | 8 × 16 | Backward | Forward |
| 12 | 16 × 8 | Forward | Bidirect |
| 13 | 8 × 16 | Forward | Bidirect |
| 14 | 16 × 8 | Backward | Bidirect |
| 15 | 8 × 16 | Backward | Bidirect |
| 16 | 16 × 8 | Bidirect | Forward |
| 17 | 8 × 16 | Bidirect | Forward |
| 18 | 16 × 8 | Bidirect | Backward |
| 19 | 8 × 16 | Bidirect | Backward |
| 20 | 16 × 8 | Bidirect | Bidirect |
| 21 | 8 × 16 | Bidirect | Bidirect |
| 22 | 8 × 8 (split) | | |
| 23 | Intra 4 × 4 | | |
| 24 | Intra 16 × 16 | | |

83

```
0
0 X₀ 1
0 X₀ 0 X₁ 1
0 X₂ 0 X₁ 0 X₀ 1
0 X₃ 0 X₂ 0 X₁ 0 X₀ 1
..........................

Xn = 0 or 1
```

84

| Code_ number | Codewords in explicit form |
|---|---|
| 0 | 0 |
| 1 | 0 0 1 |
| 2 | 0 1 1 |
| 3 | 0 0 0 0 1 |
| 4 | 0 0 0 1 1 |
| 5 | 0 1 0 0 1 |
| 6 | 0 1 0 1 1 |
| 7 | 0 0 0 0 0 0 1 |
| 8 | 0 0 0 0 0 1 1 |
| 9 | 0 0 0 1 0 0 1 |
| 10 | 0 0 0 1 0 1 1 |
| 11 | 0 1 0 0 0 0 1 |
| ..... | .............................. |

330 Y SIGNAL BLOCK

331 Cr SIGNAL BLOCK

332 Cb SIGNAL BLOCK

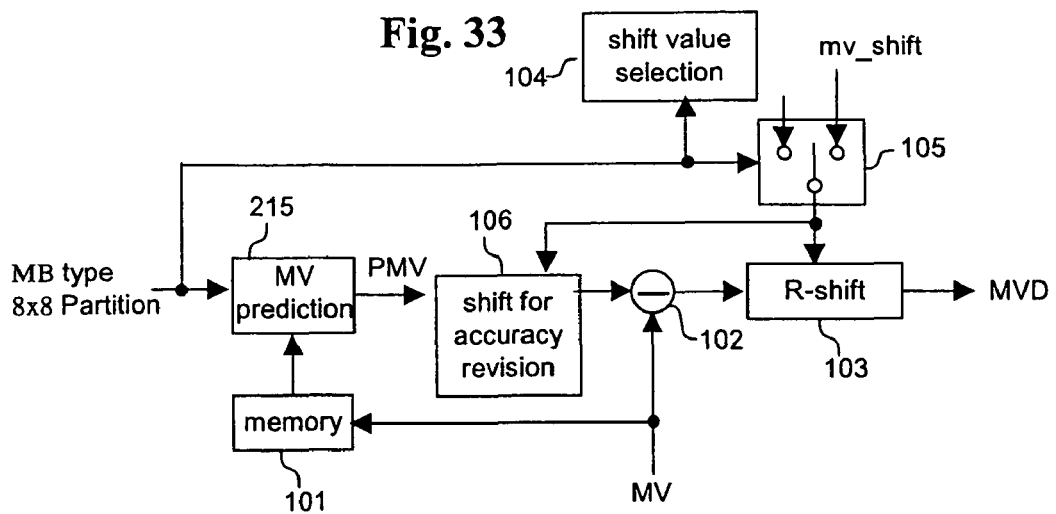
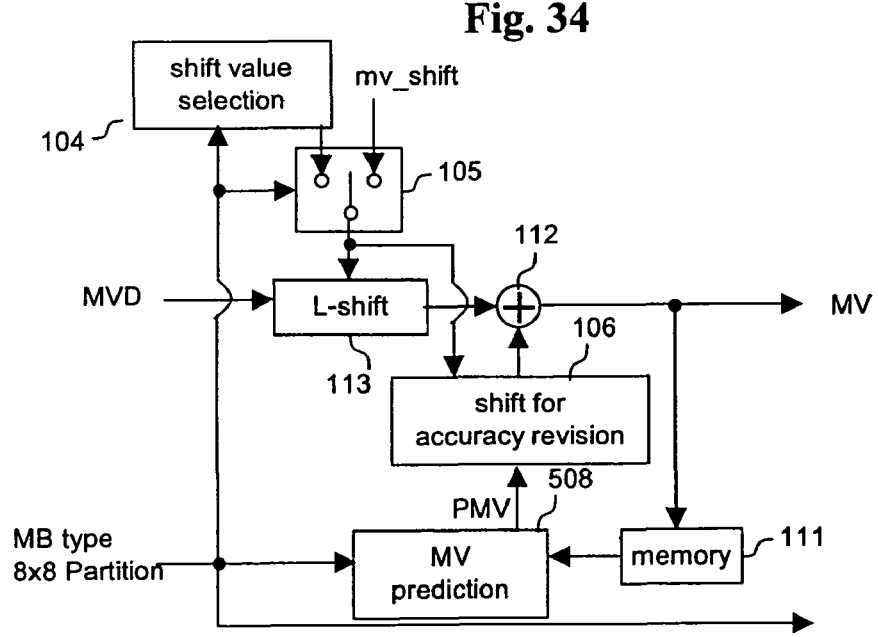

MOVING PICTURE SIGNAL CODING METHOD, DECODING METHOD, CODING APPARATUS, AND DECODING APPARATUS

CROSS-REFERENCE TO RELATED APPLICATION

This application is a Divisional of U.S. patent application Ser. No. 10/488,030, filed Feb. 27, 2004. Priority is claimed based on U.S. patent application Ser. No. 10/488,030, filed Feb. 27, 2004, which claims priority to the PCT Application PCT/JP03/00664 filed on Jan. 24, 2003, which claims the priority to Japanese Patent Application Nos. 2002-14974, 2002-36130, 2002-93541, 2002-267555 and 2002-330209 filed on Jan. 24, 2002, Feb. 14, 2002, Mar. 29, 2002, Sep. 13, 2002 and Nov. 14, 2002, respectively, and which are hereby incorporated by reference.

TECHNICAL FIELD

The present invention relates to moving picture signal coding/decoding methods, a coding apparatus and a decoding apparatus, particularly relates to the coding/decoding technique of a motion vector.

BACKGROUND ART

The outline of moving picture coding/decoding will be described below. Moving picture coding is generally performed in a coding apparatus shown in FIG. 13. One frame of a moving picture to be coded is composed of one luminance signal (Y signal: 61) and two color difference signals (Cr signal: 62, Cb signal: 63) as shown in FIG. 3, and the picture size of the color difference signal is equivalent to ½ of the luminance signal in both length and width. In a general video standard, each frame of a moving picture is divided into small blocks and is reconstructed in units of block called a macroblock.

The above-mentioned macroblock is composed of one Y signal block 30 including 16.times.16 pixels, a Cr signal block 31 and a Cb signal block 32 respectively including 8.times.8 pixels and respectively spatially coincident with one Y signal block as shown in FIG. 5. A picture signal is coded in units of macroblock. Coding is roughly classified into intracoding (an intramode) and predictive coding (an intermode).

In the coding apparatus shown in FIG. 13, in the case of intracoding, an input macroblock picture 201 to be coded is divided into DCT coding blocks, DCT is directly applied to a DCT coding block in a DCT device 203, and the value is transformed to a DCT coefficients. Each transformed coefficient is quantized in a quantizer 204 and is coded in a multiplexer 206.

DCT coding block size is generally (8.times.8) pixels in a conventional type coding method, however, recently DCT in 4.times.4-pixel size is also examined in MPEG-4 Part 10 (Advanced Video Coding) and others.

As shown in FIG. 6, each macroblock is divided into 24 pieces of 4.times.4-pixel blocks and each 4.times.4-pixel block is transformed to 16 DCT coefficients in DCT device 203.

A part of the quantized DCT coefficients is decoded to the input macroblock in an inverse quantizer 207 and an inverse DCT device 208 respectively in a local decoder 220 and is synthesized in a frame memory 210. The local decoder 220 generates the same decoded picture to that generated by a decoder described later. A picture stored in the frame memory 210 is used for the prediction of a temporal direction described later. The intracoding is applied to a macroblock (also including a first coding frame) having no similar part in the preceding frame and a part in which the accumulation of operation mismatch in DCT is to be solved.

In the case of interceding (predictive coding), processing for motion compensation between the input macroblock picture 201 and a decoded picture (a reference frame) of the coded frame stored in the frame memory 210 is executed in a motion compensator 211. The motion compensation means compression technique in a temporal direction for searching and deriving the similar part (generally, a part smaller in the sum of the absolute values of predictive error signals in a block or the square error sum is selected) to the contents of a target macroblock from a reference frame and coding the amount of its motion (a motion vector).

FIG. 4 shows processing for motion compensation. FIG. 4 shows a prediction block 75 and a motion vector 76 on the previous frame 73 (a reference frame) of a luminance signal block 72 of the current frame 71 enclosed by a thick framework. The motion vector 76 shows the amount of displacement from a block 74 shown by a broken line on the previous frame located in the spatially same position as the block enclosed by the thick framework of the current frame to the prediction block 75 on the previous frame (the length of a motion vector for a color difference signal is equivalent to a half of that of a luminance signal and is not coded). The detected motion vector is coded in the multiplexer 206 after differential processing between it and a predictive motion vector (predicted based upon a motion vector of the adjacent block) generated by an MV predictor 215. Differential processing is performed between a predictive macroblock picture 213 extracted from the previous frame by motion compensation and the input macroblock picture 201 of the current frame in a differentiator 202 and a differential macroblock picture is generated.

The differential macroblock picture is divided into 24 pieces of 4.times.4-pixel blocks as shown in FIG. 6 and each 4.times.4-pixel block is transformed to 16 DCT coefficients in the DCT device 203. Each DCT coefficient is quantized in the quantizer 204 and is coded in the multiplexer 206. In the case of interceding, after these quantized DCT coefficient are decoded to a differential macroblock picture in the inverse quantizer 207 and the inverse DCT device 208 respectively in the local decoder 220 and is added to a predictive macroblock picture in an adder 209, it is also synthesized in the frame memory 210. In this case, the number of motion vectors to be coded in one macroblock is one, however, a method of dividing a macroblock into further small blocks, calculating and coding a motion vector every small block is general. For example, MPEG-4 Part 10 (Advanced Video Coding) considers a macroblock division type (a luminance component) for motion compensation as shown in FIG. 7. Four types of types 51 to 54 are basic. As for the type 54, five types of types 54a, 54b, 54c, 54d and intracoding are further selected for four pieces of 8.times.8 blocks 54-0 to 54-3.

Further, a method of the motion compensation of predictive coding is classified into forward predictive coding in which motion compensation is performed using the information of a temporarily past frame and bi-directional predictive coding in which motion compensation is performed using temporarily past and future frames. In motion compensation in the forward predictive coding, only forward prediction is dealt, however, in motion compensation in the bi-directional coding, in addition to forward prediction, backward prediction, bi-directional prediction and direct prediction in which bi-directional prediction is performed utilizing motion vector information in a temporarily future frame are dealt.

As for the coding accuracy of a motion vector, the accuracy of an integer pixel or a smaller pixel is generally dealt. For example, in Advanced Simple Profile of MPEG-4 Part 2', ½-pixel accuracy and ¼-pixel accuracy can be selected for each bitstream. The description of a method of calculating a predicted value of the accuracy of an integer pixel or a smaller pixel is omitted, however, in the case of ½-pixel accuracy, a 2-tap linear filter is suitably used according to the position of a pixel and in the case of ¼-pixel accuracy, an 8-tap filter and a 2-tap filter are suitably used according to the position of a pixel. In MPEG-4 Part 10, it is also examined to represent a motion vector at ¼-pixel accuracy and a predicted value is calculated using a 6-tap filter and the 2-tap filter. As described above, predictive performance is enhanced by using the multiple number of taps.

A frame in which intracoding is applied to all macroblocks is called I-Picture, a frame by forward predictive coding or intracoding is called P-Picture, and a frame by bi-directional coding or intracoding is called B-Picture. In P-Picture or B-Picture, it is selected in an INTRA/INTER decision device 214 shown in FIG. 13 which of predictive coding or intracoding is used for each macroblock and the result of the decision 218 is coded in the multiplexer 206.

A coded signal of a moving picture is decoded according to a reverse procedure to coding. Generally, decoding is performed in a moving picture decoding apparatus shown in FIG. 14.

In a code decoder 501, input coded data is analyzed, information related to a motion vector and macroblock type information are outputed to an MV predictor 508 and quantized DCT coefficient information is outputed to an inverse quantizer 502. In case a macroblock type is intracoding, inverse quantization and inverse DCT are applied to decoded quantized DCT coefficient information every 4.times.4-pixel block in the inverse quantizer 502 and the inverse DCT device 503, and a macroblock picture is reconstructed. In case a predictive mode of a macroblock is predictive coding, a decoded motion vector is calculated based upon a decoded differential motion vector and a predictive motion vector in the MV predictor 508 and is input to a motion compensator 504. In the motion compensator 504, a predictive macroblock picture is extracted from a frame memory 507 in which the decoded picture of the previous frame is stored according to the amount of motion.

Next, inverse quantization and inverse DCT are applied to coded data related to a predictive error signal every 4.times.4-pixel block in the inverse quantizer 502 and the inverse DCT device 503, and a differential macroblock picture is reconstructed. The predictive macroblock picture and the differential macroblock picture are added in an adder 505 and a macroblock picture is reconstructed. The reconstructed macroblock picture is synthesized with a decoded frame picture in a synthesizer 506. The decoded frame picture is stored in a frame memory 507 for the prediction of the next frame.

For a document related to the invention, there is Japanese published unexamined patent application No. Heill-46364. In this document, in moving picture coding/decoding methods for executing coding/decoding processing in units of block, some types of motion vector precisions are prepared and means for switching motion vector coding accuracy in units of plural pieces of bundled blocks is disclosed.

In the motion compensation coding of a moving picture signal heretofore known, plural types of motion vectors included in a block are prepared and a coding method in which the coding accuracy of a motion vector is high as in the case of ⅛-pixel accuracy is studied. However, there is a tendency that a method of coding with the small number of motion vectors is selected because of the quantity of codes of motion vectors even if plural motions are included in a block. Besides, in case a predictive pixel is generated at the accuracy of an integer pixel or a smaller pixel using a multiple-tap filter, a problem of memory access that the number of pixels in a reference picture used to generate one predictive block is increased occurs. This problem comes into question particularly when motion compensation is performed.

Therefore, the object of the invention is to provide a coding method of a moving picture signal, a decoding method, a coding apparatus and a decoding apparatus in which the quantity of codes of motion vectors can be reduced and motion predictive error information by the increase of the number of blocks in a block to be coded can be reduced.

Another object of the invention is to reduce a range of memory access in motion compensation in the coding apparatus and the decoding apparatus.

DISCLOSURE OF THE INVENTION

To achieve the objects, the invention is based upon a moving picture coding method including a procedure for dividing a picture into plural coding blocks, predicting a motion vector in the coding block based upon a motion vector in the adjacent position and coding a differential motion vector calculated based upon a motion vector to be coded and its predictive motion vector in units of block and is characterized in that the coding of a motion vector is performed according to (1) a procedure for preparing some types for the accuracy of a differential motion vector, selecting the accuracy of a differential motion vector every coding block and coding the information of the selected accuracy and a differential motion vector of the accuracy or according to (2) a procedure for preparing some types for the accuracy of a motion vector, selecting the accuracy of a motion vector every coding block and coding the information of the selected accuracy and a differential motion vector calculated based upon a predictive motion vector revised to the selected accuracy and a motion vector of the selected accuracy.

In the cases of (1) and (2) include a case that the coding of an mv_shift value of a specific macroblock is omitted utilizing a type (for example, whether the number of coding motion vectors is large or not) of the macroblock and a situation of the circumference (for example, a situation of adjacent macroblocks) in addition to the determination of an accuracy value (hereinafter also called an mv_shift) for the coding of a differential motion vector and coding respectively performed for all macroblocks.

In the case of (2), difference accuracies can be allocated to a horizontal component and a vertical component of a motion vector and a differential vector calculated based upon a motion vector of accuracy allocated to each component can be coded.

For the decoding of a moving picture according to the invention, a picture of a coding block is reconstructed according to a reverse procedure to the procedure of coding using a code by the coding of a moving picture according to the invention. That is, plural accuracies of a motion vector are prepared and different accuracies are allocated to a horizontal component and a vertical component of a motion vector. Each component is revised to the allocated accuracy and a differential motion vector calculated based upon a revised predictive motion vector and a motion vector of the allocated accuracy is coded.

Further, in the case of decoding, an mv_shift value is also set corresponding to the coding of a code to be decoded. For example, in the reconstruction of the mv_shift value which is not coded because of a type of a macroblock or a situation of the surroundings in coding, the mv_shift value is determined based upon a type of a decoded macroblock or a situation of the surroundings.

The objects, the characteristics of the invention and the configuration of a coding apparatus and a decoding apparatus will be further clarified by the following description of embodiments referring to the drawings.

BRIEF DESCRIPTION OF THE DRAWINGS

FIG. 7 shows the configuration of a luminance block showing a block unit for motion compensation;

FIG. 12 shows code tables of macroblock types and 8.times.8 partition types in B-Picture in the embodiment of the invention;

FIG. 15 is an explanatory drawing for explaining an example of a code table of macroblock types in a conventional method;

FIG. 33 is a block diagram showing an embodiment of the encoder of a motion vector of the moving picture coding apparatus according to the invention;

FIG. 34 is a block diagram showing an embodiment of the decoder of a motion vector of the moving picture decoding apparatus according to the invention;

BEST MODE FOR CARRYING OUT THE INVENTION

Before embodiments of the invention are described, to facilitate the understanding of the following description, the syntax of coded data prepared in a multiplexer of a coding apparatus will be described below.

Figure 1:
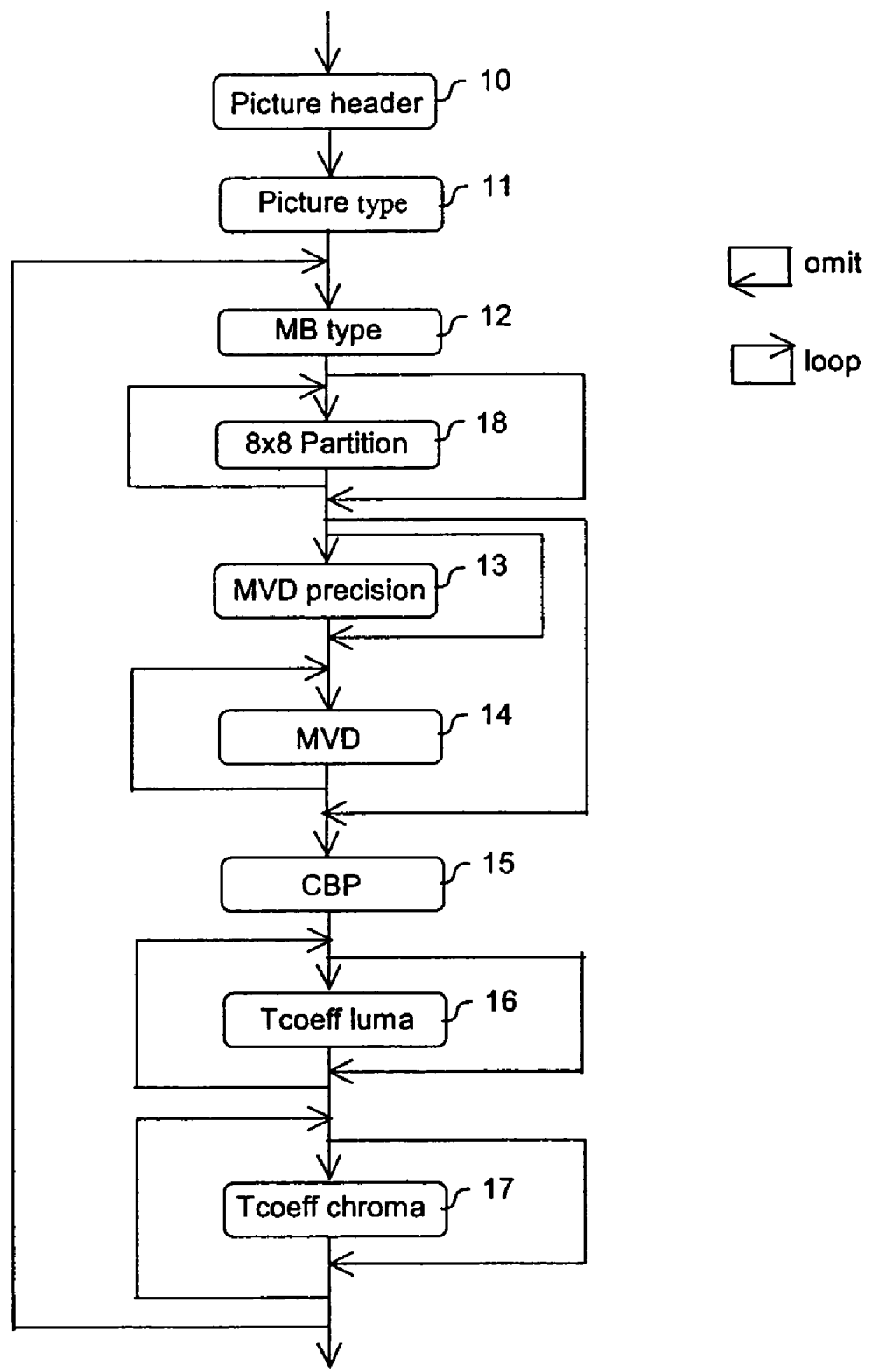
FIG. 1 shows an example of the data syntax of a forward predictive frame.
Figure 2:
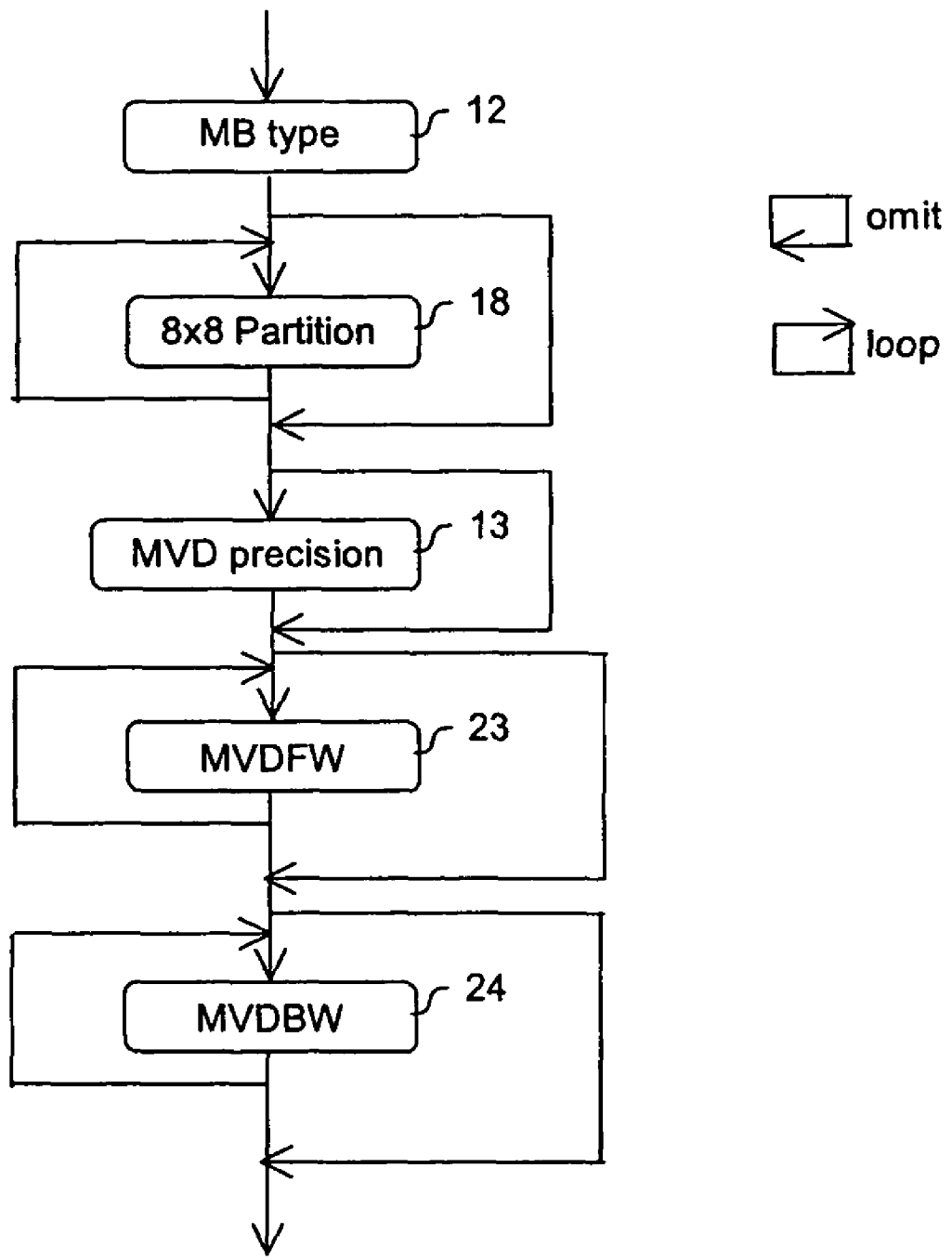
FIG. 2 shows an example of the data syntax of a bi-directional predictive frame.
Figure 3:
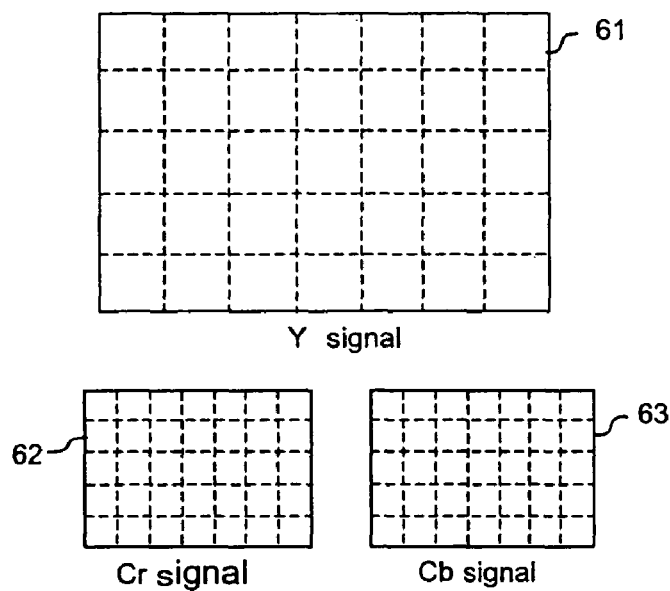
FIG. 3 is an explanatory drawing for explaining the division of a macroblock.
Figure 4:
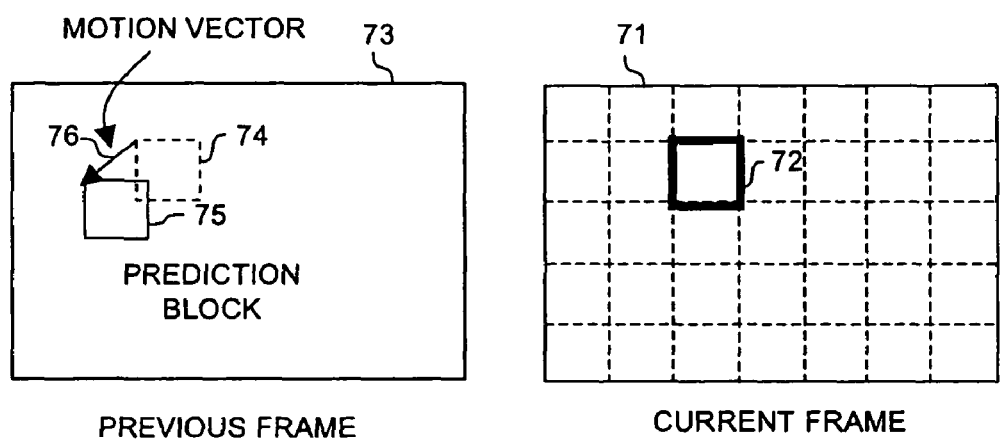
FIG. 4 is an explanatory drawing for explaining a principle of motion compensation.
Figure 5:
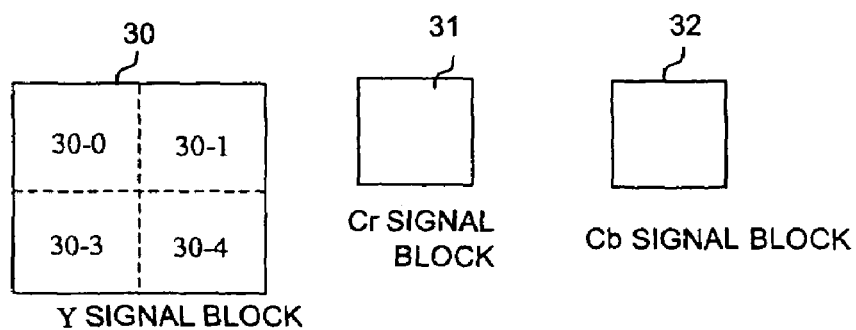
FIG. 5 shows block configuration utilized when it is coded whether a significant DCT coefficient is included in a macroblock or not.

FIG. 1 shows the data syntax of P-Picture and FIG. 2 shows a part (CBP 15 or the succeeding are omitted because they are the same as those in FIG. 1) of B-Picture data syntax. In this case, data (motion vector precision information) 13 shall not appear in data syntax. Besides, the description of I-picture is omitted because the I-picture is not included in the characteristics of the invention.

A picture header 10 includes data related to the display information such as picture size and displaying time of a frame. A picture type 11 is frame type information and a type such as I-Picture, P-Picture and B-Picture is coded here. MB type 12 to Tcoeff chroma 17 are equivalent to macroblock data and are repeated by the number of macroblocks in a frame. In the MB type 12, one mode is selected and coded for each macroblock out of macroblock modes shown in a table (P-Picture) 95 or a table (B-Picture) 96 shown in FIG. 15.

In SKIP mode, a macroblock picture in the spatially same position is extracted from a decoded picture of the previous frame and is copied. "M and N" in "IntraM.times.N" in the tables denote small block size when spatial prediction is performed. "M.times.N" denotes a small block unit when motion compensation is performed and corresponds to modes 1 to 4 shown in FIG. 7.

"Direct" means direct prediction. Block 1 and Block 2 identify two small blocks in the mode 2 or the mode 3 shown in FIG. 7 and show which a predicted direction of each small block is out of forward (forward prediction), backward (backward prediction) and bi-directional (bi-directional prediction). As for a macroblock for which "8.times.8(split)" is selected in the MB type 12, 8.times.8 partition 18 is generated. In a macroblock mode except the modes, no "8.times.8 partition" 18 is generated. In the 8.times.8 partition 18, one mode is selected for each 8.times.8 partition out of 8.times.8 partition modes shown in a table (P-Picture) 92 shown in FIG. 11 or a table (B-Picture) 94 shown in FIG. 12 and is coded. "Intra" in the tables denotes spatial prediction. "M.times.N" denotes a small block unit when motion compensation is performed and corresponds to partitions 1 to 4 shown in FIG. 7. "Direct" denotes direct prediction.

"Prediction" denotes which a predicted direction of each small block is out of forward (forward prediction), backward (backward prediction) and bi-directional (bi-directional prediction). MVD 14 denotes the coded data of a differential motion vector in P-Picture. Therefore, in case the MB type 12 is "IntraM.times.N", the above-mentioned data is not generated. In case the MB type 12 is "M.times.N", MVD 14 is repeatedly coded by the number of vectors shown in the MB type and the 8.times.8 partition. For example, as the number of differential motion vectors to be coded is two and each motion vector is composed of horizontal and vertical two components in the case of "16.times.8", four MVDs are continuously coded. MVDFW 23 and MVDBW 24 denote the coded data of a differential motion vector in B-Picture. MVDFW 23 is generated in the case of a macroblock including a motion vector according to forward prediction (also including bi-directional prediction) which the MB type 12 and the 8.times.8 partition 18 show. Similarly, MVDBW 24 is generated in the case of a macroblock including a motion vector according to backward prediction (also including bi-directional prediction) which the MB type 12 and the 8.times.8 partition 18 show. Therefore, in case the MB type 12 is IntraM.times.N or Direct, the above-mentioned data is not generated. In case the MB type 12 is M.times.N and motion vectors for forward prediction (also including bi-directional prediction) exists, MVDFW 23 is repeatedly coded by the number of vectors (the number of differential motion vectors.times.2, horizontal and vertical components) related to forward prediction (also including bi-directional prediction) which the MB type and the 8.times.8 partition show. Similarly, in case the MB type 12 is M.times.N and motion vector(s) for backward prediction (also including bi-directional prediction) exists, MVDBW 24 is repeated coded by the number of vectors (the number of differential motion vectors.times.2, horizontal and vertical components) related to backward prediction (also including bi-directional prediction) which the MB type and the 8.times.8 partition show.

Figure 6:
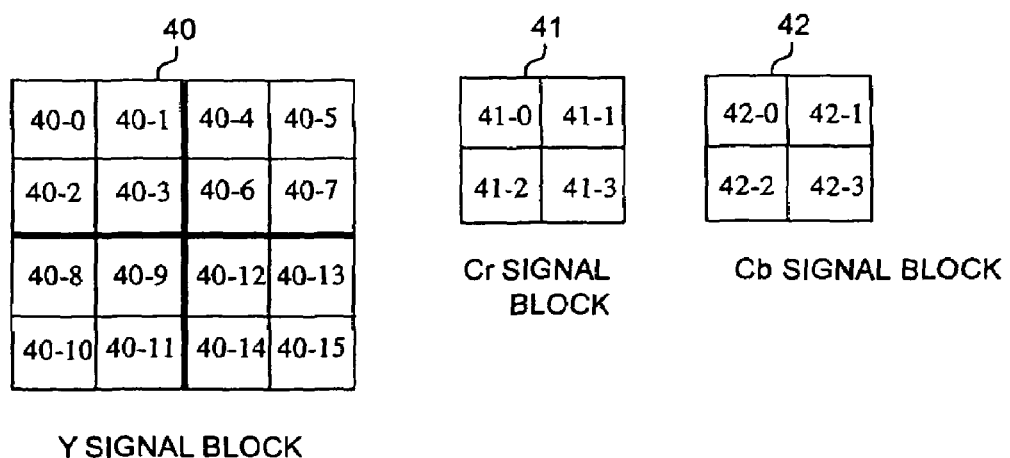
FIG. 6 shows macroblock configuration showing a block unit in which DCT and coding are performed.

CBP 15 is coded data showing whether quantized DCT coefficients except 0 (significant coefficients) are included in 16 quantized DTC coefficients or not for 24 pieces of DCT blocks shown in FIG. 6. However, as additional information is increased when the information of whether a significant coefficient exists or not is coded for 24 pieces of DCT blocks, it shall be coded whether a significant coefficient exists or not in units of 8.times.8 block in which 4 pieces of DCT blocks are united as shown in FIG. 6.

Tcoeff luma 16 shows the coded data of a quantized DCT coefficient in a luminance block 40. For coding, 16 quantized coefficients are coded in order smaller in a number from a 4.times.4 block 40-0 to a 4.times.4 block 40-15. However, as for an 8.times.8 block in relation to which it is shown in CBP that no significant coefficient exists, coding processing is omitted.

Tcoeff chroma 17 shows the coding data of a quantized DCT coefficient in the luminance block 40. For coding, sixteen pieces of quantized coefficients are coded in the order of 4.times.4 blocks 41-0, 41-2, 41-3, 41-4, 42-0, 42-1, 42-3, 42-4. However, for a signal component in relation to which it is shown in CBP 15 that no significant coefficient exists, coding processing is omitted.

Figures 16, 17:
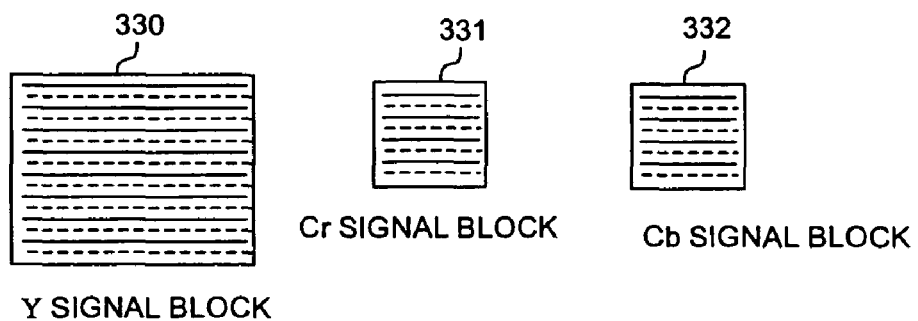
FIG. 16 shows an example of the configuration of a universal coding table.
FIG. 17 shows an example of the configuration of a macroblock having frame structure in a field signal.

For a method of coding data coded at a level of a macroblock shown in FIGS. 1 and 2, universal VLC (UVLC) using only one type of variable length code table, a coding method acquired by combining fixed length coding and variable length coding (different code tables are prepared for coded elements) and arithmetic coding (for example, refer to the non-patent document 1) are conceivable. A diagram 83 in FIG. 16 shows the configuration of UVLC and a value of Xn is '0' or '1'. A table 84 shows an example of an actual variable length code table. For a concrete method of the arithmetic coding, a method of converting the meaning of each code to a binary data and coding each bit according to an occurrence probability model showing the probability of the occurrence of 0 and 1 is conceivable. This method is called context-based adaptive binary arithmetic coding (CABAC) (written et al., "Arithmetic Coding for Data Compression", Comm. of the ACM, 30(6), 1987, pp. 520 to 541).

The invention is particularly characterized in an encoder/a decoder of a motion vector. That is, the invention is characterized in processing in MVD precision 13 in data MVD syntax shown in FIGS. 1 and 2, each configuration of an MV predictor 215 and a motion compensator 211 of the coding apparatus shown in FIG. 13, each configuration of an MV predictor 508 and a motion compensator 504 of a decoding apparatus shown in FIG. 14 and a signal processing method. The configuration of the other part and a signal processing method are substantially the same as those of the conventional type apparatuses and the methods, and embodiments of the characteristic of the invention will be described below.

<First Embodiment>

The coding of a motion vector equivalent to this embodiment is a method of preparing the some-types accuracy of a differential motion vector, selecting the accuracy of a differential motion vector for each decoding block and coding the information of the selected accuracy and the differential motion vector of the accuracy in moving picture coding (hereinafter called the motion compensation coding of a moving picture) for dividing a picture into plural coding blocks, predicting a picture signal of the coding block and a motion vector in the coding block based upon a motion vector in the adjacent position and coding a differential motion vector calculated based upon a motion vector to be coded and its predictive motion vector in units of block.

First, referring to FIG. 8, the generation of the above-mentioned predictive motion vector will be described. In this case, a reference number 50 denotes a small block which is a target for coding a motion vector. In the small block 50, for respective horizontal and vertical components of a motion vector, the medium value of motion vectors as a candidate of three blocks located in the adjacent positions A, B, C is calculated and a motion vector of the medium value is regarded as a predictive motion vector. However, in case the block in the position C is not coded yet because of coding order and the position in a macroblock and in case the block in the position C is located outside the picture, a motion vector of a block located in a position D is used as one of candidate motion vectors in place of the position C. In case the blocks in the positions A, B, C, D have no motion vector, predictive processing is executed with the motion vector regarded as '0' vector. At this time, in case two of the three candidate blocks have no motion vector, the remaining one candidate motion vector is regarded as a predictive motion vector. As for a block 51-0 in Mode 1 (51) shown in FIG. 7 and small blocks 54*a*-0, 54*b*-0, 54*b*-1, 54*c*-0, 54*c*-2 and 54*d*-0 to 54*d*-3 in Mode 4 (54), the same predictive method is used.

Figures 8, 9:
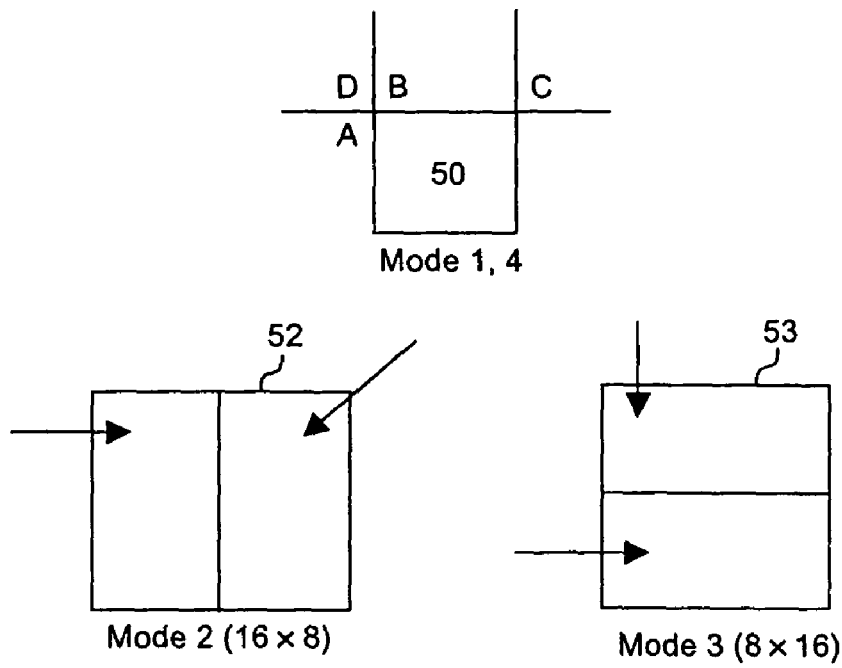
FIG. 8 is an explanatory drawing for explaining the generation of a predictive motion vector.
FIG. 9 shows an example of a code table of motion vector accuracy.

As for two small blocks (52-0, 52-1) in Mode 2 (52) and two small blocks (53-0, 53-1) in Mode 3 (53), a motion vector of a block located at the base of an arrow shown in FIG. 8 is regarded as a predictive value. In any mode, a motion vector for a color difference component is not coded and a motion vector for a luminance component is used by dividing it in two and others.

In the first embodiment, first, three types of ¼-pixel accuracy, ½-pixel accuracy and 1-pixel accuracy are prepared as a candidate for the accuracy of a differential motion vector. If MV denotes a value calculated by quadrupling a motion vector component represented at ¼-pixel accuracy and PMV denotes a value calculated by quadrupling a predictive motion vector component represented at ¼-pixel accuracy, the value of MV for each accuracy candidate is limited as follows.

1-pixel accuracy: MV that values of (MV−PMV) in all small blocks in a macroblock are equivalent to a multiple of 4 for both horizontal and vertical components ½-pixel accuracy: MV that values of (MV−PMV) in all small blocks in a macroblock are equivalent to a multiple of 2 for both horizontal and vertical components ¼-pixel accuracy: MV that values of (MV−PMV) in all small blocks in a macroblock are equivalent to a multiple of 1 for both horizontal and vertical components Therefore, to make the effect of this method reflected in a coding characteristic, a performance evaluation function calculated by adding the effect of the code quantity of a motion vector to the absolute value sum or the square error sum of a predictive error signal is prepared in estimating a motion vector. At this time, accuracy smaller in the total of estimate values is determined as the accuracy of a differential motion vector by calculating an added value of an estimate value of a small block for each accuracy after the optimum estimate value of each small block is calculated for each accuracy (MV−PMV) and the motion vector estimation processing of all small blocks in a macroblock is performed. A coded differential motion vector MVD is calculated in the following expression (1).

$$MVD = (MV - PMV) \gg mv\_shift \quad (1)$$

"mv_shift" in the expression (1) is a value shown in a table 81 shown in FIG. 9. The expression (1) shows that a value calculated by arithmetically shifting a value calculated by subtracting a predictive motion vector component PMV from a motion vector component MV rightward by a number shown in mv_shift is a differential motion vector component MVD. In this case, a value calculated by subtracting the predictive motion vector component PMV from the motion vector component MV is a multiple of 1<<mv_shift and the differential motion vector component MVD to which an arithmetic right bit shift is applied is a multiple of 1.

In case a picture type is P-Picture, coding is performed, regarding mv_shift as a coded data element shown in the data MVD precision 13 shown in FIG. 1 and regarding MVD as a coded element shown in the data MVD 14. In case a picture type is B-Picture, coding is performed, regarding mv_shift as a coded data element shown in the data MVD precision 13 shown in FIG. 2 and regarding MVD as a coded data element shown in the data MVDFW 23 (in case MVD is a differential motion vector of forward prediction) or in the data MVDBW 24 (in case MVD is a differential motion vector of backward prediction). The coding of MVD precision is omitted in a macroblock in which no coded data (MVD 14 or MVDFW 23 and MVDBW 24) of a differential motion vector is generated. Concretely, in case P-Picture: MB type is IntraM.times.N or MB type is 8.times.8(split) and the 8.times.8 partition of four small blocks are all intra, in case B-Picture: MB type is IntraM.times.N or Direct and further in case MB type is 8.times.8(split) and the 8.times.8 partition of four small blocks are all intra or direct, the coding of MVD precision is omitted.

As described in relation to the conventional type, for a coding method, UVLC or arithmetic coding is adopted. In the table 81 shown in FIG. 9, examples of coding codes in case UVLC is used are shown. In the case of arithmetic coding, a generated value of a predictive motion vector of coding MB (7C shown in FIG. 10) for example is coded according to a generation probability table calculated based upon the mv_shift values of just left MB (7A shown in FIG. 10) and just upper MB (7B shown in FIG. 10).

In the decoding apparatus, each motion vector component is decoded, that is, an MV value is regenerated (decoded) according to the following expression (2) based upon a decoded mv_shift value, decoded MVD and PMV.

$$MV = (MVD << mv\_shift) + PMV \qquad (2)$$

The expression (2) shows that a value calculated by adding a predictive motion vector component PMV to a value calculated by arithmetically shifting a differential motion vector component MVD leftward by a number shown in mv_shift is a decoded motion vector component MV. The decoded differential motion vector component MVD varies from a multiple of 1 to a multiple (corresponding to MV−PMV in the coding apparatus) of 1<<mv_shift by the arithmetic left bit shift process. The decoded motion vector component MV is regenerated to a value of original accuracy by adding PMV to this value.

Next, a case that a candidate of the accuracy of a differential motion vector is four types of ⅛-pixel accuracy, ¼-pixel accuracy, ½-pixel accuracy and 1-pixel accuracy will be described. If MV has a value calculated by octupling a motion vector component represented at ⅛-pixel accuracy and PMV has a value calculated by octupling a predictive motion vector component represented at ⅛-pixel accuracy, a value of MV for each accuracy candidate is limited by the representation as follows.

1-pixel accuracy: MV that values of (MV−PMV) in all small blocks in a macroblock are equivalent to a multiple of 8 for both horizontal and vertical components ½-pixel accuracy: MV that values of (MV−PMV) in all small blocks in a macroblock are equivalent to a multiple of 4 for both horizontal and vertical components ¼-pixel accuracy: MV that values of (MV−PMV) in all small blocks in a macroblock are equivalent to a multiple of 2 for both horizontal and vertical components ⅛-pixel accuracy: MV that values of (MV−PMV) in all small blocks in a macroblock are equivalent to a multiple of 1 for both horizontal and vertical components As its method of estimating motion is the same as that in the case of three types of ¼-pixel accuracy, ½-pixel accuracy and 1-pixel accuracy, the description is omitted. A differential motion vector MVD is calculated in the expression (1). In this case, a value calculated by subtracting a predictive motion vector component PMV from a motion vector component MV is a multiple of 1<<mv_shift, a differential motion vector component MVD to which the arithmetic right bit shift process is applied is a multiple of 1 and they are calculated in the above-mentioned expression (1). "mv_shift" in the expression (1) is a value shown in a table 82 in FIG. 9.

As a method of coding mv_shift and MVD is the same as that in case a candidate of the accuracy of a differential motion vector is three types of ¼-pixel accuracy, ½-pixel accuracy and 1-pixel accuracy, the description is omitted, however, a coding code in case UVLC is used shall comply with not the table 81 but the table 82.

For processing in the decoding apparatus, a candidate of the accuracy of a differential motion vector is also the same as that in the case of three types of ¼-pixel accuracy, ½-pixel accuracy and 1-pixel accuracy, and a decoded MV value of each motion vector component is regenerated based upon a decoded mv_shift value, decoded MVD and PMV according to the above-mentioned expression (2). The expression (2) shows that a value calculated by adding a predictive motion vector component PMV to a value calculated by arithmetically shifting a differential motion vector component MVD leftward by a number shown in mv_shift is a decoded motion vector component MV. A decoded differential motion vector component MVD varies from a multiple of 1 to a multiple (corresponding to MV−PMV in the coding apparatus) of 1<<mv_shift by the arithmetic left bit shift process. The decoded motion vector component MV is regenerated to a value of original accuracy by adding PMV to this value.

<Second Embodiment>

A second embodiment is related to a method of preparing plural-types accuracy of a motion vector, selecting the accuracy of a motion vector for each macroblock and coding the information of the selected accuracy and a differential motion vector calculated based upon a predictive motion vector the accuracy of which is revised to the selected accuracy and a motion vector to be coded the accuracy of which is revised to the selected accuracy in the motion compensation coding of a moving picture.

First, for candidates of the accuracy of a predictive motion vector and a motion vector to be coded, three types of ¼-pixel accuracy, ½-pixel accuracy and 1-pixel accuracy are prepared. If MV has a value calculated by quadrupling a motion vector component represented at ¼-pixel accuracy and PMV has a value calculated by quadrupling a predictive motion vector component represented at ¼-pixel accuracy, a value of MV for each accuracy candidate is limited by the representation as follows.

1-pixel accuracy: MV the values of which in all small blocks in a macroblock are equivalent to a multiple of 4 for both horizontal and vertical components ½-pixel accuracy: MV the values of which in all small blocks in a macroblock are equivalent to a multiple of, 2 for both horizontal and vertical components ¼-pixel accuracy: MV the values of which in all small blocks in a macroblock are equivalent to a multiple of 1 for both horizontal and vertical components Therefore, to make the effect of this method reflected in a coding characteristic, a performance evaluation function calculated by adding the effect of the quantity of codes of a motion vector to the absolute value sum or the square error sum of a predictive error signal is prepared in estimating a motion vector. At this time, accuracy smaller in the total of estimate values can be determined as the accuracy of a differential motion vector by calculating an added value of an estimate value of a small block for each accuracy after the optimum estimate value of each small block is calculated for each accuracy of MV and the motion vector estimation process of all small blocks in a macroblock is performed. A differential motion vector MVD to be coded is calculated in the following expression.

$$MVD = (MV - ((PMV >> mv\_shift) << mv\_shift)) >> mv\_shift \qquad (3)$$

The expression (3) shows that a value calculated by further applying a second arithmetic right bit shift by a number shown in mv_shift to a value calculated by subtracting a value calculated by arithmetically shifting a predictive motion vector component PMV leftward immediately after arithmetically shifting the predictive motion vector component PMV rightward by a number shown in mv_shift from a motion vector component MV is equivalent to a differential motion vector component MVD. In this case, the continuous right bit shift process and left bit shift process respectively applied to a predictive motion vector component fulfill the role of converting a value of the predictive motion vector component PMV to the value of a multiple of 1<<mv_shift such as MV. A differential motion vector component MVD becomes a multiple of 1 by a second arithmetic right bit shift process.

As described above, in a method of switching the accuracy of a motion vector to be coded, the accuracy of PMV is not required to be considered in the process of motion estimation, however, in an MVD generation process, processing for lowering the accuracy of a PMV predictive motion vector to the accuracy of mv_shift is required to be executed. However, the number of operation steps can be reduced by simplifying the expression (3) as follows. It is effective in integrating such as circuit design. In this method, after a motion vector component MV and a predictive motion vector component PMV are converted to a value of a multiple of 1, differential processing is executed. A value calculated by multiplying a predictive vector component converted to a multiple of 1 and "1<<mv_shift" is same as a predictive motion vector component converted to a value of "1<<mv_shift" in the above-mentioned expression, and as a motion vector component MV is a multiple of "1<<mv_shift", no lack of information is caused by using the following expression.

$$MVD=(MV>>mv\_shift)-(PMV>>mv\_shift) \quad (4)$$

As the allocation of mv_shift and MVD to the data syntax shown in FIGS. 1 and 2 and a coding method are the same as the method of switching the accuracy of a differential motion vector, the description is omitted.

In the decoding apparatus, a decoded MV value of each motion vector component is regenerated based upon a decoded mv_shift value, decoded MVD and decoded PMV according to the following expression.

$$MV=(MVD<<mv\_shift)+((PMV>>mv\_shift)<<mv\_shift) \quad (5)$$

This expression (5) shows that a value acquired by adding a value calculated by arithmetically shifting a predictive motion vector component PMV leftward immediately after the predictive motion vector component PMV is arithmetically shifted rightward by a number shown in mv_shift to a value calculated by arithmetically shifting a differential motion vector component MVD leftward by the number shown in mv_shift is a decoded motion vector component MV. In this case, the continuous right bit shift process and left bit shift process respectively for a predictive motion vector component and processing for shifting MVD leftward by a number shown in a differential motion vector component mv_shift fulfill the role of converting each component to a value of a multiple "1<<mv_shift". Therefore, a decoded motion vector component MV becomes a multiple of original 1<<mv_shift. The number of operation steps can be reduced by simplifying the expression (5) as follows. It is effective in integrating such as circuit design. The expression (5) shows that a value calculated by applying a left arithmetic bit shift to a value calculated by adding a decoded differential motion vector DMV to a predictive motion vector component PMV converted to a value of a multiple of 1 by a number shown in mv_shift is a decoded motion vector component MV. A value calculated by multiplying a predictive vector component converted to a multiple of 1 and "1<<mv_shift" is same as a predictive motion vector component converted to a multiple of "1<<mv_shift" in the above-mentioned expression and as a differential motion vector component DMV is a multiple of 1, no lack of information is caused by using the following expression (6).

$$MV=(MVD+(PMV>>mv\_shift))<<mv\_shift \quad (6)$$

Next, a case that for a candidate of the accuracy of a differential motion vector, four types of ⅛-pixel accuracy, ¼-pixel accuracy, ½-pixel accuracy and 1-pixel accuracy are prepared will be described. If MV has a value calculated by octupling a motion vector component represented at ⅛-pixel accuracy and PMV has a value calculated by octupling a predictive motion vector component represented at ⅛-pixel accuracy, a value of MV for each accuracy candidate is limited by this representation as follows.

1-pixel accuracy: MV the values of which in all small blocks in a macroblock are equivalent to a multiple of 8 for both horizontal and vertical components ½-pixel accuracy: MV the values of which in all small blocks in a macroblock are equivalent to a multiple of 4 for both horizontal and vertical components ¼-pixel accuracy: MV the values of which in all small blocks in a macroblock are equivalent to a multiple of 2 for both horizontal and vertical components ⅛-pixel accuracy: MV the values of which in all small blocks in a macroblock are equivalent to a multiple of 1 for both horizontal and vertical components As a method of estimating motion is the same as that in the case of three types of ¼-pixel accuracy, ½-pixel accuracy and 1-pixel accuracy, the description is omitted. A differential motion vector MVD to be coded is calculated in the following expression.

$$MVD=(MV-((PMV>>mv\_shift)<<mv\_shift))>>mv\_shift \quad (3)$$

"mv_shift" in the expression is a value shown in the table 82 in FIG. 9. This expression shows that a value calculated by further applying a second arithmetic right bit shift by a number shown in mv_shift to a value calculated by subtracting a value calculated by arithmetically shifting a predictive motion vector component PMV leftward immediately after the predictive motion vector component PMV is arithmetically shifted rightward by the number shown in mv_shift from a motion vector component MV is equivalent to a differential motion vector component MVD. In this case, the continuous right bit shift process and left bit shift process for a predictive motion vector component fulfill the role of converting a value of the predictive motion vector component PMV to the value of a multiple of 1<<mv_shift such as MV.

Besides, a differential motion vector component MVD becomes a value of a multiple of 1 by the second arithmetic right bit shift process.

As a method of coding mv_shift and MVD is the same as that in case a candidate of the accuracy of a differential motion vector is three types of ¼-pixel accuracy, ½-pixel accuracy and 1-pixel accuracy, the description is omitted, however, a coding code in case UVLC is used shall comply with not the table 81 but the table 82. However, the number of operation steps can be reduced by simplifying the above-mentioned expression as follows. It is effective in integrating such as circuit design. In this expression, after a motion vector component MV and a predictive motion vector component PMV are converted to values of a multiple of 1, differential processing is executed. As a value calculated by multiplying a predictive vector component converted to a multiple of 1 and "1<<mv_shift" is same as the predictive motion vector component converted to a multiple of 1<<mv_shift in the above-mentioned expression and a motion vector component MV is a multiple of 1<<mv_shift, no lack of information by using the following expression is caused.

$$MVD=(MV>>mv\_shift)-(PMV>>mv\_shift) \quad (4)$$

Processing in the decoding apparatus is also the same as that in case a candidate of the accuracy of a differential motion vector is three types of ¼-pixel accuracy, ½-pixel accuracy and 1-pixel accuracy, and a decoded MV value of each motion vector component is regenerated based upon a decoded mv_shift value, decoded MVD and PMV according to the following expression.

$$MV=(MVD<<mv\_shift)+((PMV>>mv\_shift)<<mv\_shift) \quad (5)$$

This expression shows that a value calculated by adding a value calculated by arithmetically shifting a predictive motion vector component PMV leftward immediately after the predictive motion vector component PMV is arithmetically shifted rightward by a number shown in mv_shift to a value calculated by arithmetically shifting a differential motion vector component MVD leftward by the number shown in mv_shift is a decoded motion vector component MV. In this case, the continuous right bit shift process and left bit shift process for the predictive motion vector component and the processing for arithmetically shifting MVD leftward by the number shown in the differential motion vector component mv_shift fulfill the role of converting each component to a value of a multiple of 1<<mv_shift. Therefore, the decoded vector component MV becomes a multiple of original 1<<mv_shift. The number of operation steps can be reduced by simplifying this expression as follows. It is effective in integrating such as circuit design. This expression shows that a value calculated by applying a left arithmetic bit shift to a value calculated by adding a decoded differential motion vector DMV to a predictive motion vector component PMV converted to a value of a multiple of 1 by a number shown in mv_shift is a decoded motion vector component MV. The value acquired by making the predictive vector component converted to a multiple of 1 "mv_shift"-fold is similar to the predictive motion vector component converted to a multiple of mv_shift in the above-mentioned expression and as the differential motion vector component DMV is a multiple of 1, no lack of information by using the following expression is caused.

$$MV=(MVD+(PMV>>mv\_shift))<<mv\_shift \quad (6)$$

To compare the above-mentioned first and second embodiments, as in the first embodiment, the accuracy of an actually coded differential motion vector is adjusted, operation is simpler in the first embodiment, compared with that in the second embodiment. In the meantime, as in the second embodiment, the accuracy of a motion vector to be coded is adjusted, a search pixel in case each accuracy is supposed does not depend upon a predictive vector. Therefore, in case only coding performance is pursued, the first embodiment is effective, however, in a memory access reduction method described later, the second embodiment is effective.

<Third Embodiment>

A third embodiment is related to a coding method and a decoding method of determining beforehand according to a block mode without possibly performing the coding of an mv_shift value, and is related to a method of preventing the increase of the quantity of codes of the mv_shift value in a region in which the selectivity of a macroblock is high. That is, in a mode in which the number of motion vectors in a macroblock is small, processing for coding and decoding a differential motion vector at default motion vector accuracy defined beforehand is executed. Processing for coding and decoding motion vector accuracy information is omitted by this processing.

For example, in a macroblock the MB type of which is 16.times.16, a coding apparatus and a decoding apparatus are set so that coding and decoding are performed at ¼-pixel accuracy or ⅛-pixel accuracy, and in a macroblock in these modes, processing for coding and decoding accuracy information is omitted. In this case, only the macroblock the MB type of which is 16.times.16 is set as a mode in which the processing for coding and decoding accuracy information is omitted, however, the object can be further extended. For example, it is also effective to set the coding apparatus and the decoding apparatus so that processing for coding and decoding macroblocks the MB type of which is 16.times.16, 16.times.8, 8.times.16 at ¼-pixel accuracy or ⅛-pixel accuracy is performed. In P-Picture, only the macroblock the MB type of which is 16.times.16 is set as a mode in which the processing for coding and decoding accuracy information is omitted and the number of motion vectors to be coded is large. In B-Picture, the macroblocks the MB type of which is 16.times.16, 16.times.8, 8.times.16 can be set as the mode in which the processing for coding and decoding accuracy information is omitted.

The default value of the motion vector accuracy can be set in a range of 0-3(0-2 in the case of a {fraction (¼)} MC type) like an mv_shift value and is switched in units of bit stream or in units of frame. At this time, a code of the default value shall be included in a header at the beginning of data in the case of a bit stream unit and picture header data in the case of a frame unit. In the case of the bit stream unit, if only the code is provided beforehand in the coding apparatus and the decoding apparatus, it is not required to be included in coded data.

Figures 10, 11:
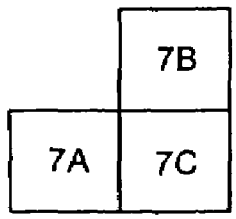
FIG. 10 is an explanatory drawing for explaining a method of predicting motion vector accuracy.
FIG. 11 shows code tables of macroblock types and 8.times.8 partition types in P-Picture in an embodiment of the invention.

Further, additional information accompanied by the coding of an mv_shift value can be reduced by preparing a macroblock type in which a value of mv_shift shown in a table 91 shown in FIG. 11 and a table 93 shown in FIG. 12 in place of the table 95 and the table 96 shown in FIG. 15 is defined. Furthermore coding efficiency can be enhanced by suitably switching a probability model used for coding based upon the number of motion vectors included in a macroblock when an mv_shift value is arithmetically coded. In this case, a switching unit of mv_shift is set to a macroblock unit, however, the switching unit may be also every 8.times.8. Such processing can be realized by providing a mode in which processing is executed every 8.times.8 and a mode in which processing is executed every 16.times.16 to MB_type. Such processing can be also realized by a method of providing a mode in which switching is performed for each 8.times.8 to the table 81 or the table 82 and coding further four pieces of mv_shift values every 8.times.8.

Furthermore, the selection of the accuracy of a differential motion vector or a motion vector may be also fixed in the whole frame and may be also fixed in the whole sequence. It means the simplification of coding/decoding processes that the selection of the accuracy is fixed. Therefore, in simple coding/decoding methods in which a integrating cost is considered, it is effective to fix the switching of the accuracy in units of frame and in units of sequence.

<Fourth Embodiment>

A fourth embodiment is related to a method of uniquely determining a shift value based upon a situation of the surroundings. That is, the quantity of codes of an mv_shift value is reduced by predicting the mv_shift value of a macroblock to be coded based upon the adjacent macroblock. For example, an mv_shift value of a macroblock to be coded (the macroblock 7c shown in FIG. 10) is predicted based upon the respective mv_shift values of the just left macroblock (7A) and the just upper macroblock (7B). For a predicting method, there is a method of predicting based upon added values of the mv_shift values of 7A and 7B. For concretely utilized means, there is control means for omitting the coding of an mv_shift value (MVD precision) and using ⅛-pixel accuracy or ¼-pixel accuracy as a defined value in both the coding and decoding apparatuses in case the added value is 0 and the MB type of 7c is 16.times.16 and coding the mv_shift value in case the added value is not 0 or MB type is not 16.times.16. The concrete example is one example and there are multiple types of combination such as the type of the adjacent macroblock used for prediction, a method of predicting, an MB type to be controlled and assortment in control. For example, the quantity of codes of an mv_shift value can be reduced by extending an MB type to be controlled up to two or less differential motion vectors and extending a control point of an added value up to two or less. There is a method of predicting an mv_shift value of current MB based upon the mv_shift value of the adjacent MB in such a method as the prediction of a motion vector and coding a differential value.

The following variations are also included in the means for switching the coding accuracy of a motion vector in the above-mentioned embodiments.

In this embodiment, candidates of the coding accuracy of a motion vector are ⅛-pixel accuracy, ¼-pixel accuracy, ½-pixel accuracy and 1-pixel accuracy, however, a candidate is not limited to these. For example, there are a case that {fraction (1/16)}-pixel accuracy is included and a case that two types of ½-pixel accuracy and 1-pixel accuracy are prepared.

In the above-mentioned embodiments, the coding of coding accuracy information of a motion vector is performed in units of macroblock, however, the coding accuracy information of a motion vector may be also switched every plural macroblock groups.

Further, in the above-mentioned embodiments, four types shown in FIG. 7 are prepared for a mode in which motion compensation blocks in a macroblock are divided, however, as the motion vector coding method in this specification can be executed even if the type and the number of modes in which motion compensation blocks are divided are changed, motion vector coding block configuration is not limited.

Besides, in the above-mentioned embodiments, the motion vector coding method in this specification in which for a method of coding data, UVLC and arithmetic coding are described can be executed without being limited to the type of entropy coding. Besides, the configuration of a code table of UVLC and a method of arithmetic coding/decoding are also not limited to the tables in the embodiments.

Furthermore, in this embodiment, the respective default values of an mv_shift value in the modes of 16.times.16, 16.times.8 and 8.times.16 are utilized, however, the default values can be applied to a partition mode of a part of 8.times.8 (split). Besides, in this embodiment, the default value is set in units of bit stream or in units of frame, however, different values may be also allocated to each macroblock unit. For example, there is a method of setting the default value to 1 in the 16.times.16 mode and setting the default value to 0 in the 16.times.8 and 8.times.16 modes. Generally speaking, in the macroblock mode and the 8.times.8 partition mode, the coding accuracy of an applied differential motion vector (or an applied motion vector) has only to be defined in units of frame or in units of sequence, to be coded and to be transmitted (in the case of the sequence unit, if only coding accuracy in each mode is determined in the coding apparatus and in the decoding apparatus beforehand, the coding of accuracy information is not required). As described above, it means simplifying coding/decoding processing to fix a unit of switching the selection of coding accuracy. The integrations cost is further reduced by increasing modes in which the default value is defined. In a coding/decoding method requiring simpler configuration, it is effective to fix a unit of switching coding accuracy to more modes.

The embodiments of the coding method and the decoding method of a moving picture according to the invention have been described. As for the coding apparatus shown in FIG. 13 in the embodiments out of the moving picture coding apparatus and the moving picture decoding apparatus according to the invention, first, a determination process for turning on/off the coding of an mv_shift value according to the combination of an MB type and 8.times.8 partition, a motion estimation process in consideration of the mv_shift value, a process for calculating MVD, MVDFW, MVDBW respectively including mv_shift and a process for transmitting the mv_shift value to the multiplexer 206 are added to the motion compensator 211. Besides, a process for coding the mv_shift value as MVD precision is added to the multiplexer 206. As for the decoding apparatus shown in FIG. 14, a process for applying a determination process for turning on/off the decoding of an mv_shift value according to decoded values of an MB type and 8.times.8 partition, a process for decoding MVD precision as an mv_shift value and a process for transmitting the mv_shift value to the MV predictor 508 are added to the code decoder 501. Besides, a process for regenerating MVD, MVDFW, MVDBW respectively including mv_shift to MV is added to the MV predictor 508.

FIGS. 25, 27, 29, 31, 33, 35, 37, 39 and 41 are block diagrams showing the configuration of each main part (each encoder of a motion vector) equivalent to embodiments of the moving picture coding apparatus according to the invention. FIGS. 26, 28, 30, 32, 34, 36, 38, 40 and 42 are block diagrams showing the configuration of each main part (each decoder of a motion vector) equivalent to embodiments of the moving picture decoding apparatus according to the invention corresponding to the coding apparatus shown in FIGS. 25, 27, 29, 31, 33, 35, 37, 39 and 41.

In each drawing, the same reference number is allocated to the substantially same functional block. As the configuration and the operation of the apparatuses in each drawing can be easily realized by the description of the first to fourth embodiments, only relation with each embodiment is described and the detailed description is omitted.

Figure 25:
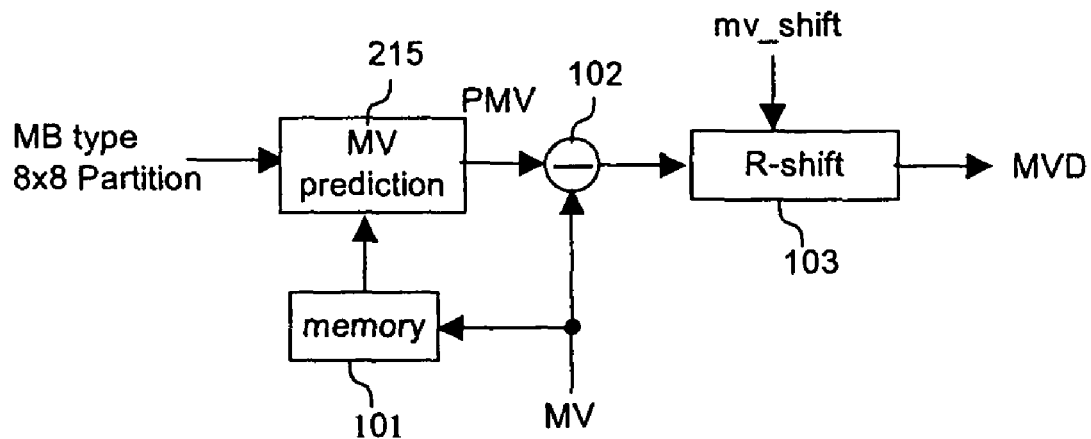
FIG. 25 is a block diagram showing an embodiment of an encoder of a motion vector of the moving picture coding apparatus according to the invention.
Figure 26:
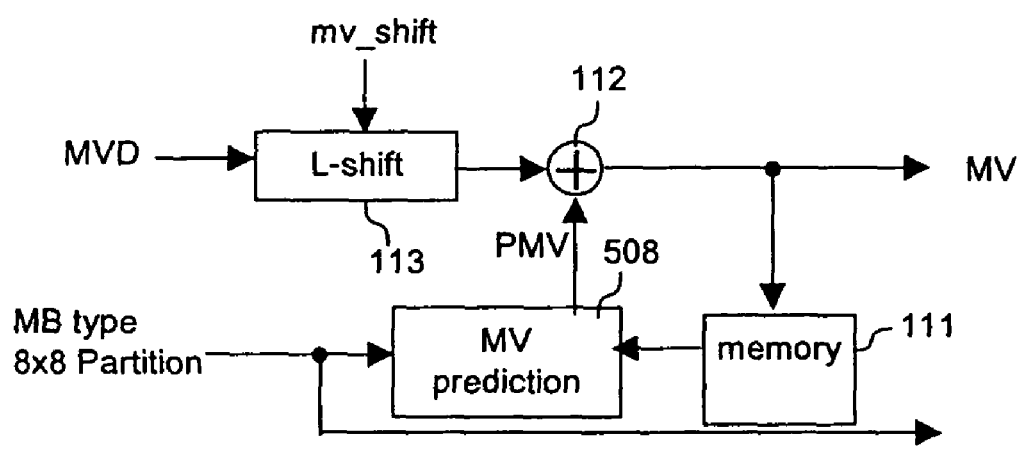
FIG. 26 is a block diagram showing an embodiment of a decoder of a motion vector of the moving picture decoding apparatus according to the invention.

The devices shown in FIGS. 25 and 26 are configured by circuits for executing the expressions (1) and (2) in the first embodiment, and the determination of a shift (mv_shift) value is controlled by only input (selected in detecting a motion vector) from an external device. The MV predictor 215 generates a predictive motion vector PMV utilizing a memory 101 storing the motion vector MV of each block. A subtracter 102 calculates difference MV−PMV between these. A right shift processor 103 shifts MV−PMV rightward. As a decoder executes processing reverse to the processing of an encoder, the memory 101 for storing a motion vector MV, a left shift processor 113 and an adder 112 are provided.

Figure 27:
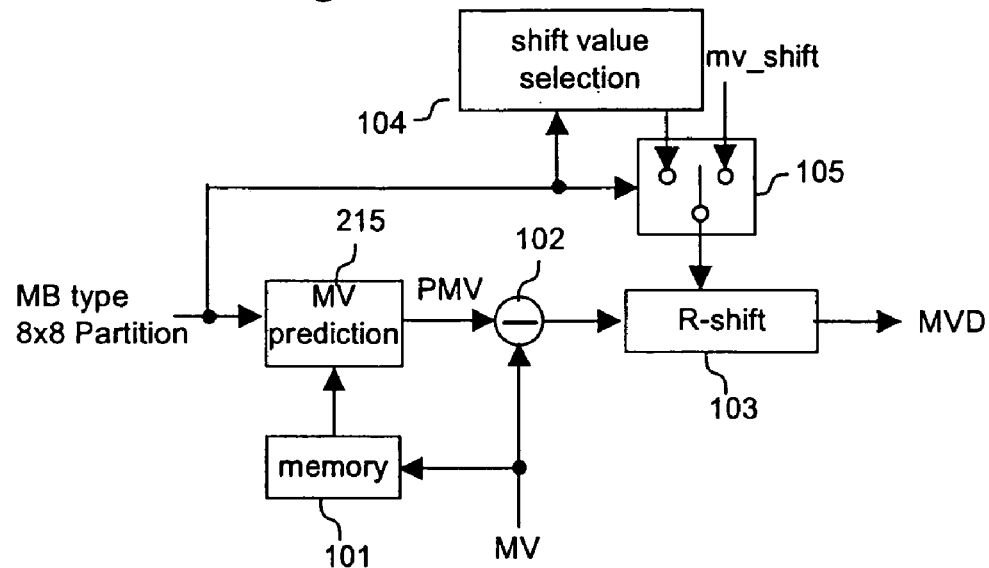
FIG. 27 is a block diagram showing an embodiment of the encoder of a motion vector of the moving picture coding apparatus according to the invention.
Figure 28:
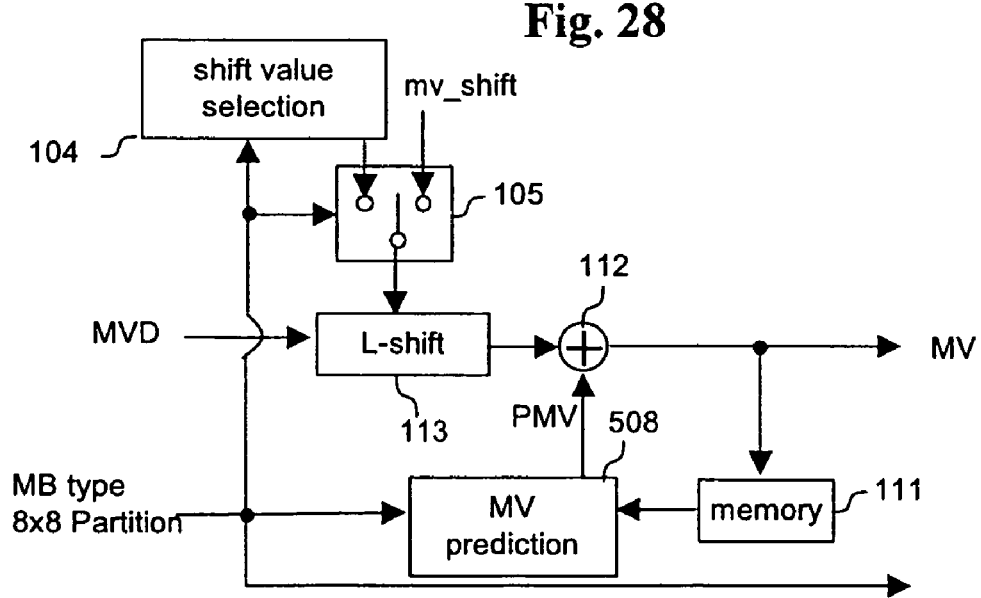
FIG. 28 is a block diagram showing an embodiment of the decoder of a motion vector of the moving picture decoding apparatus according to the invention.

The devices shown in FIGS. 27 and 28 are configured by circuits for executing the expressions.

(1) and (2) in the first embodiment and the determination of a shift (mv_shift) value is controlled by either of input (selected in detecting a motion vector) from an external device or a condition such as a type of a macroblock. A shift value selector 104 selects an mv_shift value in case a specific block type is selected and a control circuit 105 instructs the right shift processor 103 to shift by the mv_shift value corresponding to the block type.

Figure 29:
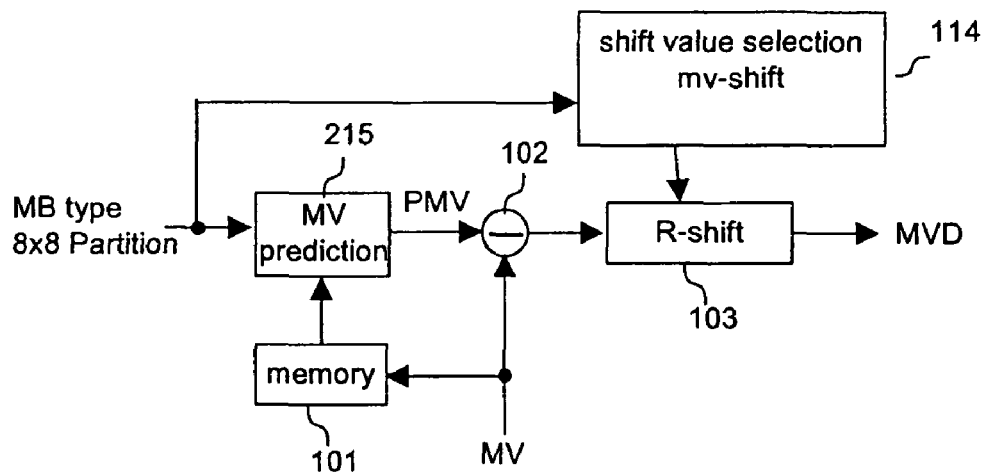
FIG. 29 is a block diagram showing an embodiment of the encoder of a motion vector of the moving picture coding apparatus according to the invention.
Figure 30:
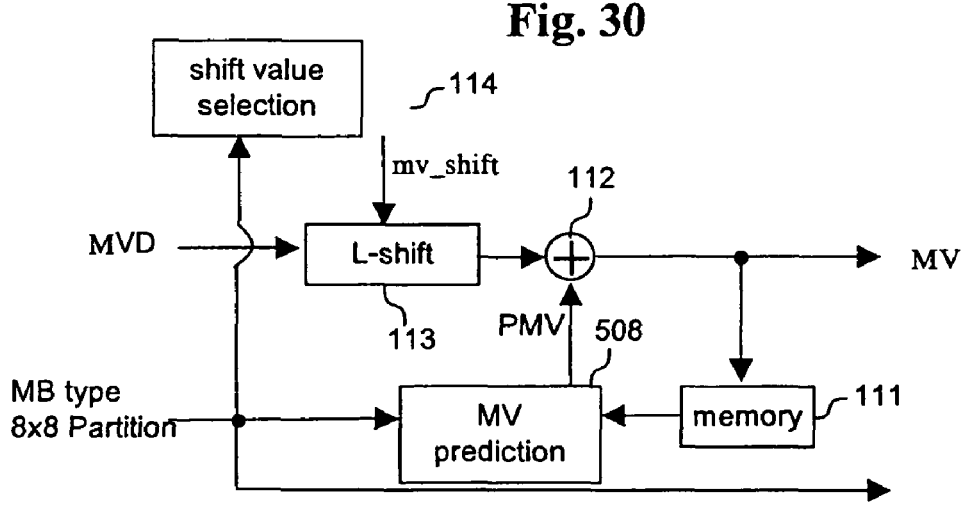
FIG. 30 is a block diagram showing an embodiment of the decoder of a motion vector of the moving picture decoding apparatus according to the invention.

The devices shown in FIGS. 29 and 30 are configured by circuits for executing the expressions (1) and (2) in the first embodiment and the determination of a shift (mv_shift) value is controlled by only a condition such as a macroblock type.

Figure 31:
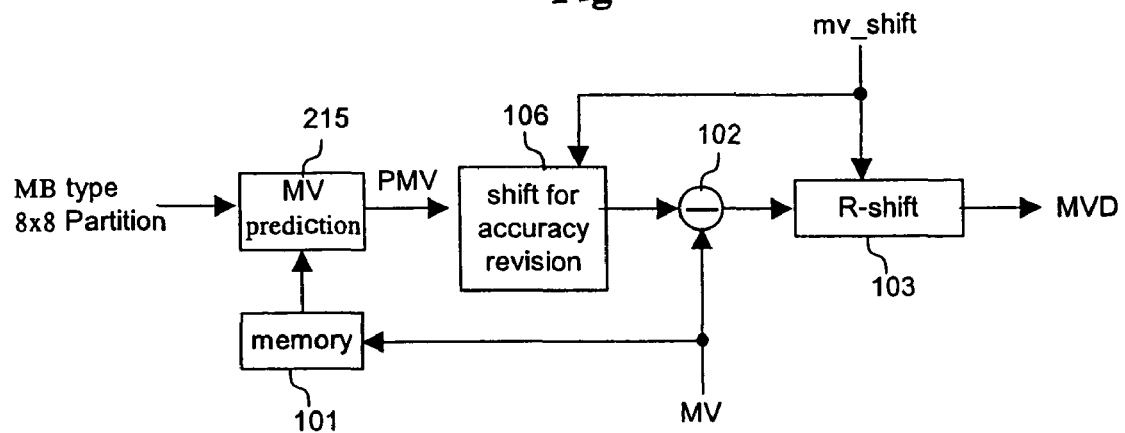
FIG. 31 is a block diagram showing an embodiment of the encoder of a motion vector of the moving picture coding apparatus according to the invention.
Figure 32:
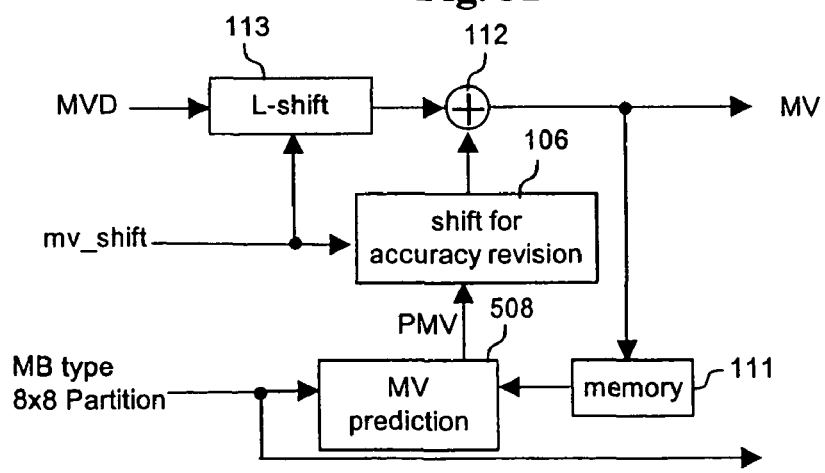
FIG. 32 is a block diagram showing an embodiment of the decoder of a motion vector of the moving picture decoding apparatus according to the invention.

The devices shown in FIGS. 31 and 32 are configured by circuits for executing the expressions (3) and (5) in the second embodiment and the determination of a shift (mv_shift) value is controlled by only input (acquired in detecting a motion vector) from an external device. An processor 106 for accuracy revision processes (PMV>>mv_shift)<&1−t; mv_shift shown in the expression (3).

The devices shown in FIGS. 33 and 34 are configured by circuits for executing the expressions (3) and (5) in the second embodiment and the determination of a shift (mv_shift) value is controlled by either of input (acquired in detecting a motion vector) from an external device or a condition such as a macroblock type.

Figure 35:
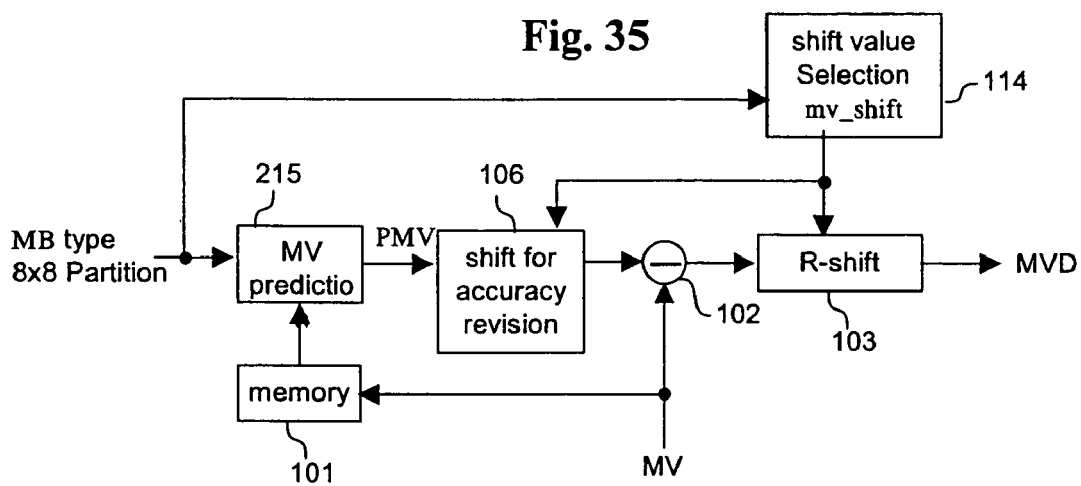
FIG. 35 is a block diagram showing an embodiment of the encoder of a motion vector of the moving picture coding apparatus according to the invention.
Figure 36:
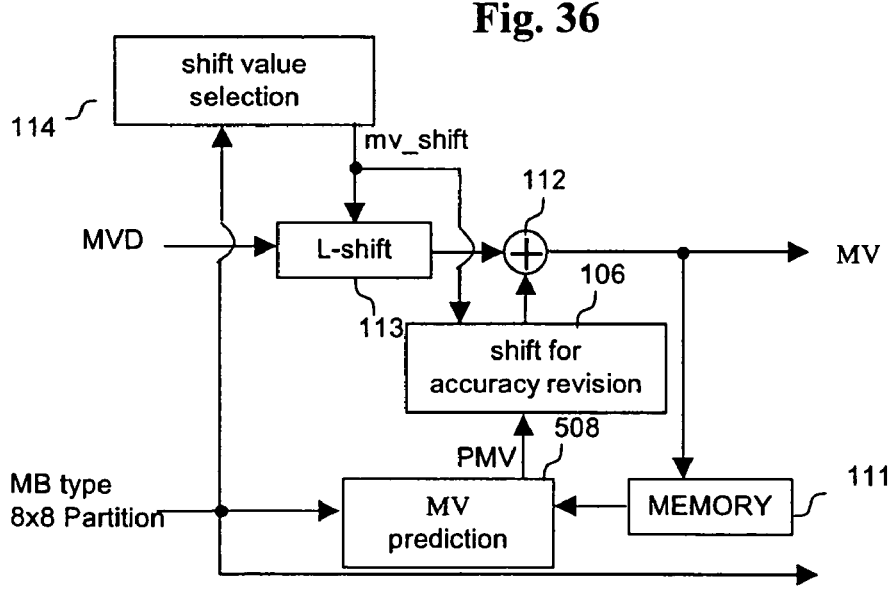
FIG. 36 is a block diagram showing an embodiment of the decoder of a motion vector of the moving picture decoding apparatus according to the invention.

The devices shown in FIGS. 35 and 36 are configured by circuits for executing the expressions (3) and (5) in the second embodiment and the determination of a shift (mv_shift) value is controlled by only a macroblock type and others.

Figure 37:
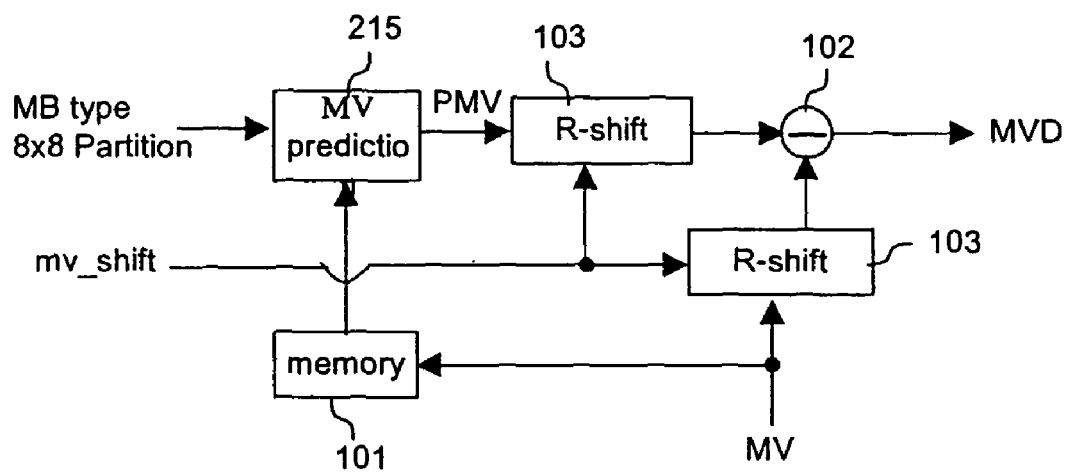
FIG. 37 is a block diagram showing an embodiment of the encoder of a motion vector of the moving picture coding apparatus according to the invention.
Figure 38:
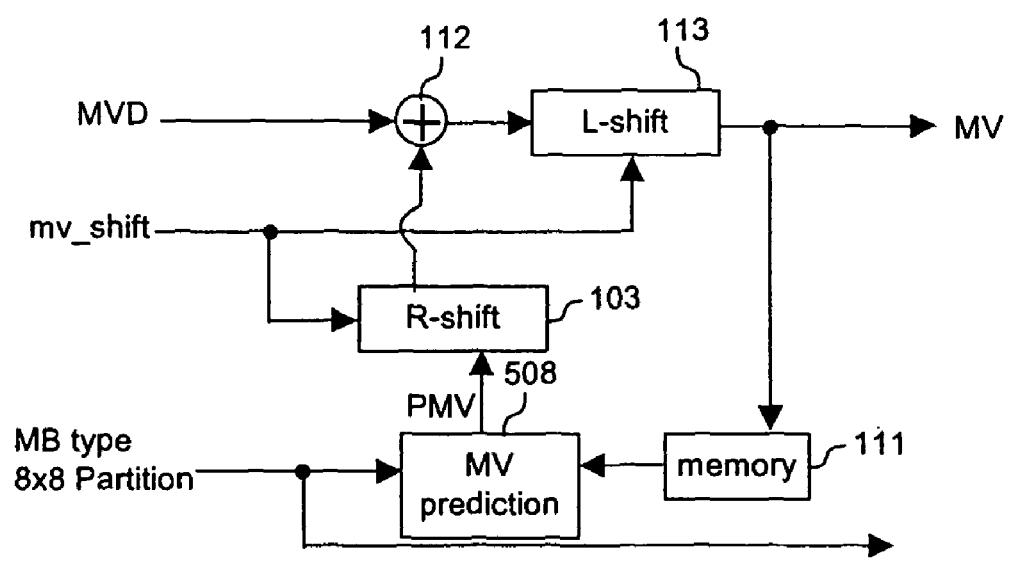
FIG. 38 is a block diagram showing an embodiment of the decoder of a motion vector of the moving picture decoding apparatus according to the invention.

The devices shown in FIGS. 37 and 38 are configured by circuits for executing the expressions (4) and (6) in the second embodiment and the determination of a shift (mv_shift) value is controlled by only input (acquired in detecting a motion vector) from an external device.

Figure 39:
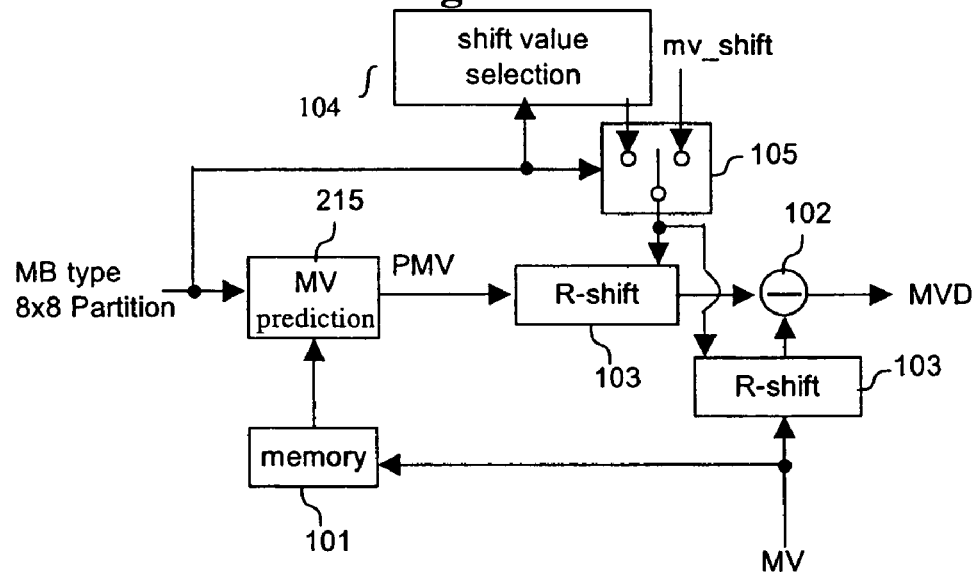
FIG. 39 is a block diagram showing an embodiment of the encoder of a motion vector of the moving picture coding apparatus according to the invention.
Figure 40:
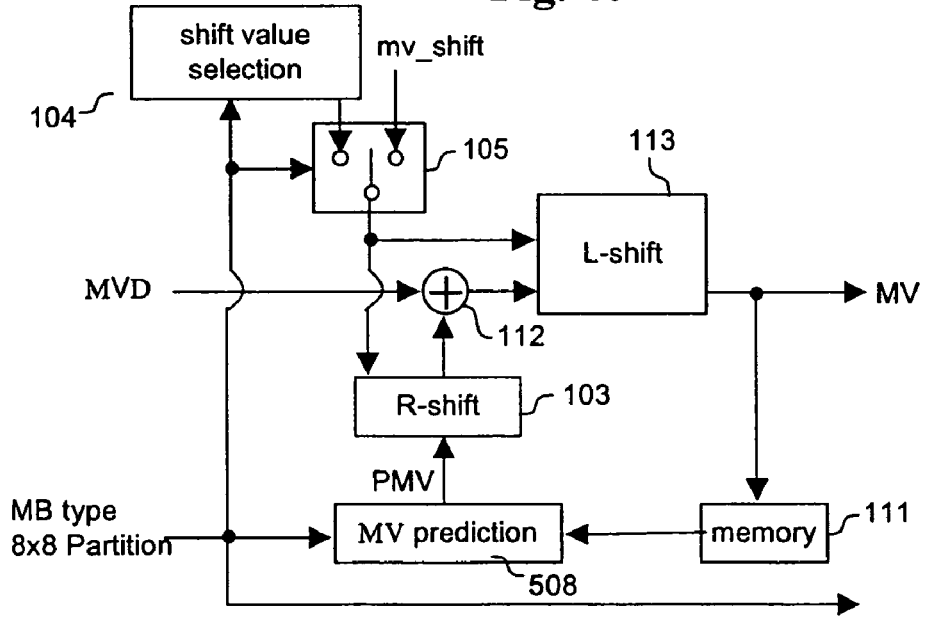
FIG. 40 is a block diagram showing an embodiment of the decoder of a motion vector of the moving picture decoding apparatus according to the invention.

The devices shown in FIGS. 39 and 40 are configured by circuits for executing the expression (4) and (6) in the second embodiment and the determination of a shift (mv_shift) value is controlled by either of input (selected in detecting a motion vector) from an external device or a condition such as a macroblock type.

Figure 41:
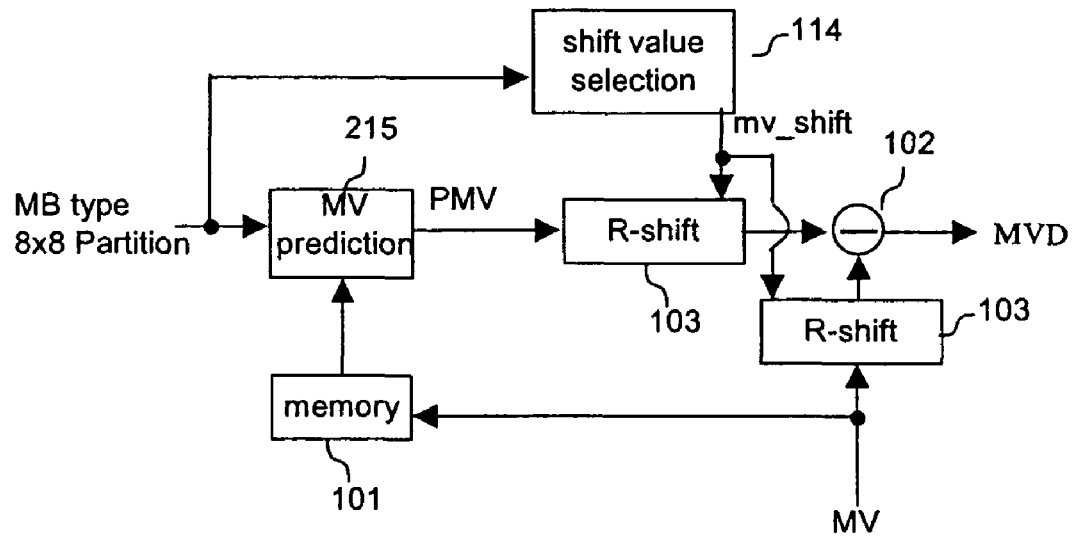
FIG. 41 is a block diagram showing an embodiment of the encoder of a motion vector of the moving picture coding apparatus according to the invention.
Figure 42:
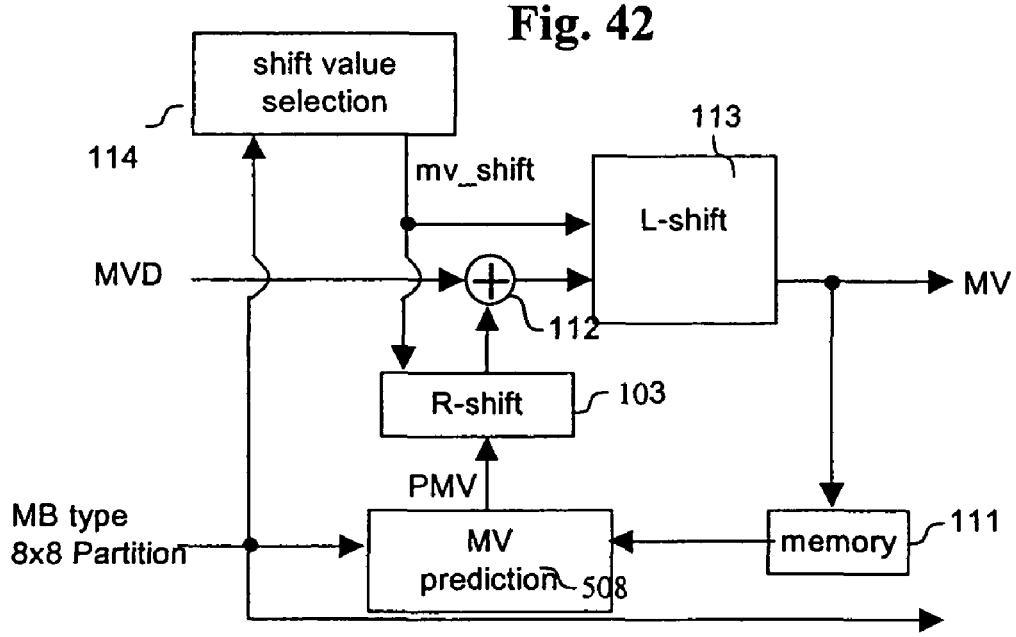
FIG. 42 is a block diagram showing an embodiment of the decoder of a motion vector of the moving picture decoding apparatus according to the invention.

The devices shown in FIGS. 41 and 42 are configured by circuits for executing the expressions (4) and (6) in the second embodiment and the determination of a shift (mv_shift) value is controlled by a condition such as a macroblock type.

<Fifth Embodiment>

Figure 18:
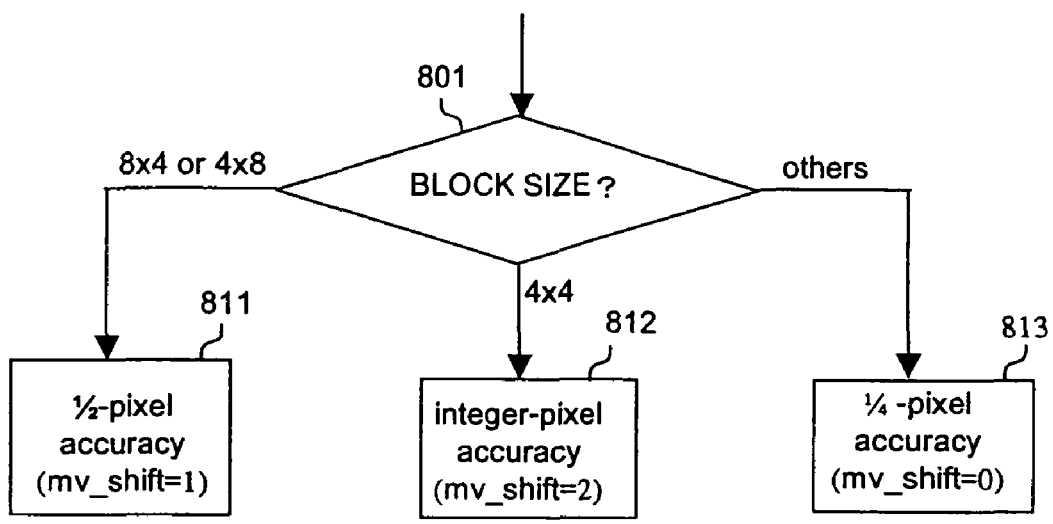
FIG. 18 is a flowchart showing processing for switching the coding accuracy of a motion vector according to block size.

FIG. 18 is a flowchart showing a coding method equivalent to a fifth embodiment.

The fifth embodiment is related to coding/decoding methods for switching the accuracy of a coding motion vector to solve a problem that a memory access region is expanded in motion compensation using a filter with long taps.

The long taps filter is used for generating only a predictive pixel at the fractional accuracy. Therefore, a memory access region can be reduced by limiting the coding accuracy of a motion vector to an integer pixel. However, prediction performance is degraded by limiting the coding accuracy of a motion vector to an integer pixel. Then, in the fifth embodiment, pixel accuracy is limited according to an extent in which the expansion of a memory access region has an effect upon mounting devices or installing software. Particularly, only in case block size in motion compensation is small, the coding accuracy of a motion vector is limited.

The smaller block size is, the larger the effect of the expansion of the memory access region is. A small block in size has few pixels to be accessed in case of integer pixel accuracy. Therefore, to compare a large block in size and a small block in size, the smaller block size is, the larger the ratio of an expanded access region to the access range in the above case is.

In the coding method equivalent to this embodiment, in case the motion compensation of ¼-pixel accuracy is applied to block division shown in FIG. 7, block size is first decoded (a process 801) as shown in FIG. 18 and an mv_shift value is selected. In this embodiment, in the case of 8.times.8 partition 2(8.times.4) and 8.times.8 partition 3(4.times.8), ½-pixel accuracy. (a process 811) is selected, in the case of 8.times.8 partition 3(4.times.4), integer-pixel accuracy (a process 812) is selected, in the case of a block of 8.times.8 pixels or in larger size, ¼-pixel accuracy (a process 813 shown in FIG. 18) is selected, the right shift processor 103 is driven by the selected mv_shift and motion compensation is performed. In the coding of a motion vector, mv_shift is set to 1 in a block in 8.times.4- and 4.times.8-pixel size, mv_shift is set to 2 in a block in 4.times.4-pixel size, and mv_shift is set to 0 in a block in pixel size except them.

Besides, in a method using P-picture and B-picture, the above-mentioned switching is applied to only B-picture and in the case of P-picture, motion compensation may be also performed at ¼-pixel accuracy independent of block size. In this case, block size to which motion compensation at integer-pixel accuracy is applied is only 4.times.4, however, the block size may be also expanded up to 8.times.4 and 4.times.8. In this case, in a block in 8.times.4-, 4.times.8- and 4.times.4-pixel size, mv_shift is set to 2 and in a block in pixel size except it, mv_shift is set to 0.

The encoders and the decoders of a motion vector equivalent to this embodiment in the moving picture coding/decoding apparatuses are configured as shown in FIGS. 41 and 42.

<Sixth Embodiment>

Figure 19:
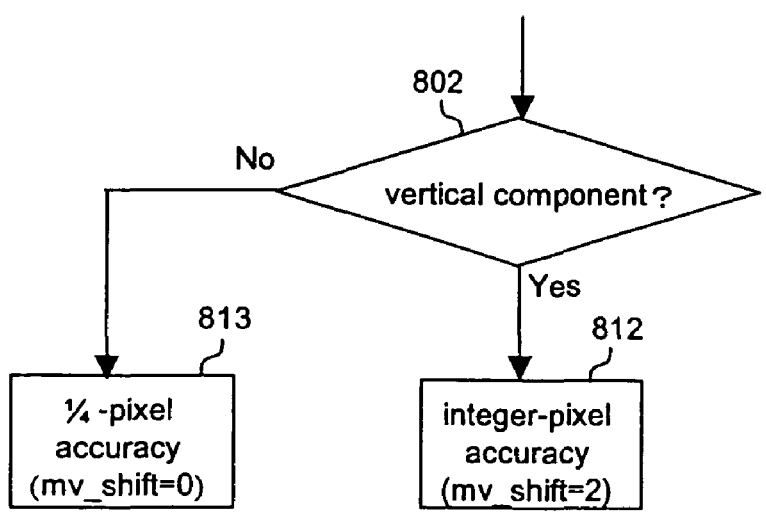
FIG. 19 is a flowchart showing processing for switching the coding accuracy of a motion vector according to a component of the motion vector in the embodiment of the invention.
Figure 45:
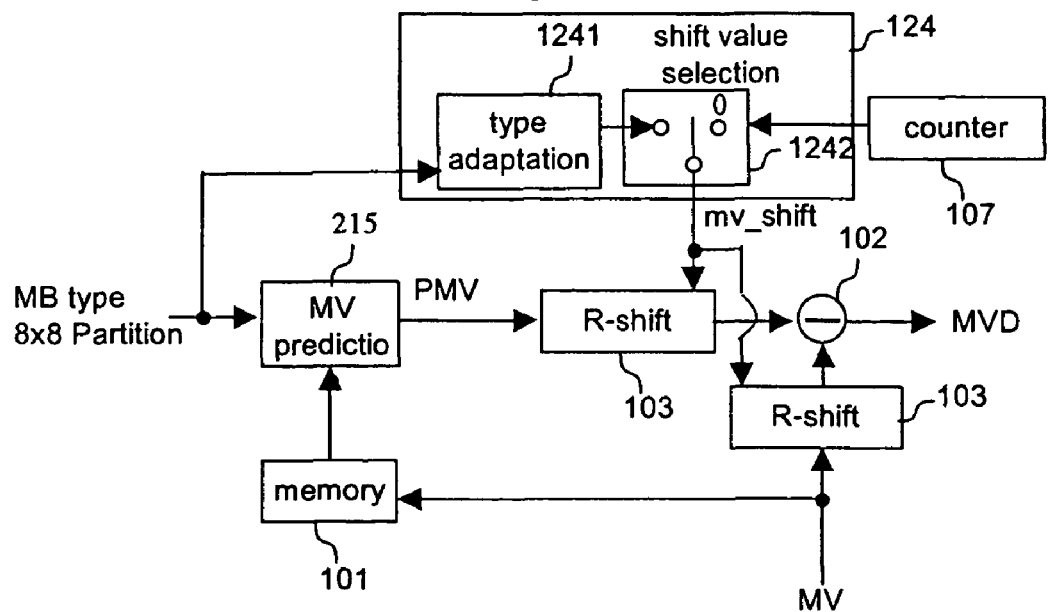
FIG. 45 is a block diagram showing an embodiment of the encoder of a motion vector of the moving picture coding apparatus according to the invention.
Figure 46:
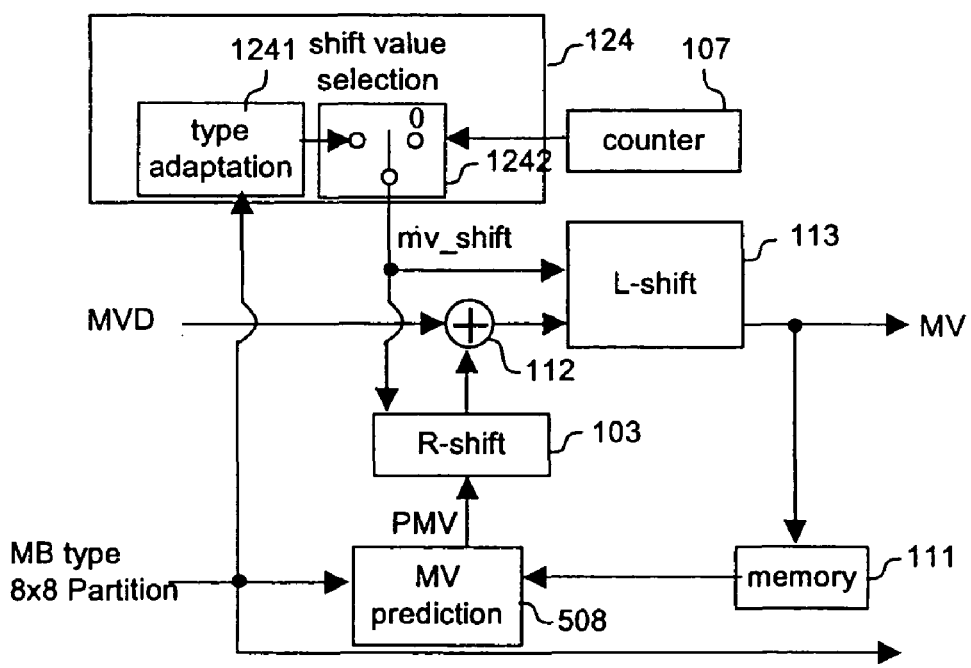
FIG. 46 is a block diagram showing an embodiment of the decoder of a motion vector of the moving picture decoding apparatus according to the invention.

FIG. 19 is a flowchart showing a coding method equivalent to a sixth embodiment of the invention, and FIGS. 45 and 46 are a block diagrams showing a main part of the coding apparatus and a block diagram showing a main part of the decoding apparatus. Also in this embodiment, to solve the problem that a memory access region is expanded because of motion compensation using a filter with long taps, a memory access range is limited by coding vertical and horizontal components of a motion vector at different coding accuracy.

A shift selector 124 of the encoder discriminates whether a motion vector is a vertical component or not (the process 801) as shown in FIG. 19 and selects mv_shift. A type adapter 124 executes the right shift processor 103 at the selected mv_shift and performs motion compensation. In this embodiment, in motion compensation at ¼-pixel accuracy, integer-pixel accuracy (the process 812) is set to a vertical component of a motion vector, ¼-pixel accuracy (the process 813) is set to a horizontal component, mv_shift is set to 2 when the vertical component is coded/decoded and mv_shift is set to 0 when the horizontal component is coded/decoded.

The method of limiting the coding accuracy of a vertical component of a motion vector has large effect upon the expansion of a memory access range in this embodiment. Generally, picture data is stored in a memory in the order of a raster scan from the left upside toward the right downside. Therefore, in case an access range is expanded from a certain pixel to the adjacent pixel, one pixel in a horizontal direction means one pixel, however, one pixel in a vertical direction means one line. Therefore, a cost required for memory access in the vertical direction is larger than that in the horizontal direction. Further, in a method of storing pixel data of 1 byte/per 1 pixel not in units of byte (one pixel) but in units of word (every 2 pixels) and in units of dword (every four pixels), as the expansion of a memory access range in the horizontal direction is caused in units of word or dword, that effect is not large so much. In the meantime, in access by one pixel in the vertical direction, a memory access range is necessarily expanded. Therefore, the method of limiting the coding accuracy of a motion vector in the vertical direction is effective from the viewpoint of the reduction of a memory access range.

Figure 23:
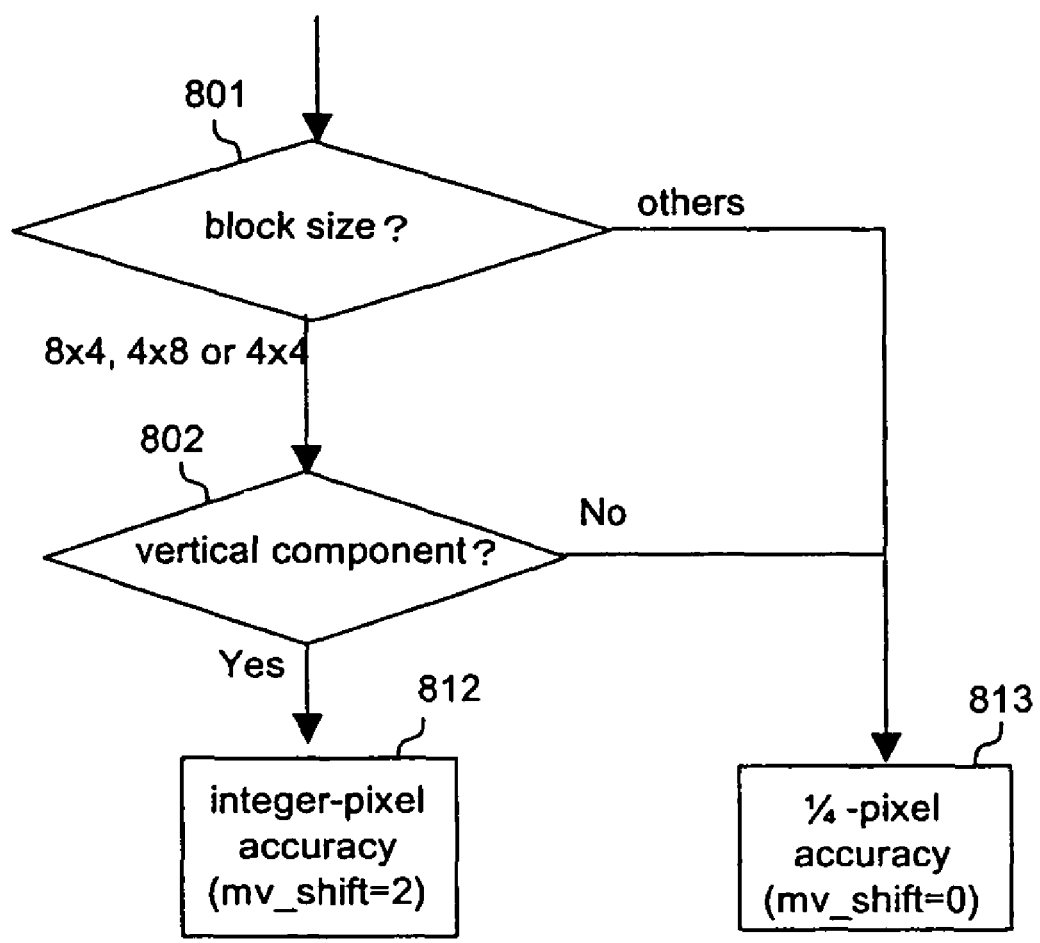
FIG. 23 shows an example of a flowchart showing processing for switching the coding accuracy of a motion vector according to block size and a component of the motion vector in the embodiment of the invention.

The methods described in the fifth and sixth embodiments are synthesized and a process shown in FIG. 23 can be also executed. That is, the shift selector 124 limits the vertical component of a motion vector to that of an integer pixel only in a block in 8.times.4-, 4.times.8- and 4.times.4-pixel size. Further, means for switching a vector component the range of which is limited according to block size is also effective.

As described above, the smaller block size is, the larger an effect by the expansion of a memory access region is, however, this also holds true in the aspect ratio of a block. That is, in case the ratio in the longitudinal and lateral size of a block is different, a smaller component in size is more greatly influenced by the expansion of an access range. To consider block partition shown in FIG. 7, it can be said that it is effective to limit a component in 4-pixel size.

<Seventh Embodiment>

Figure 24:
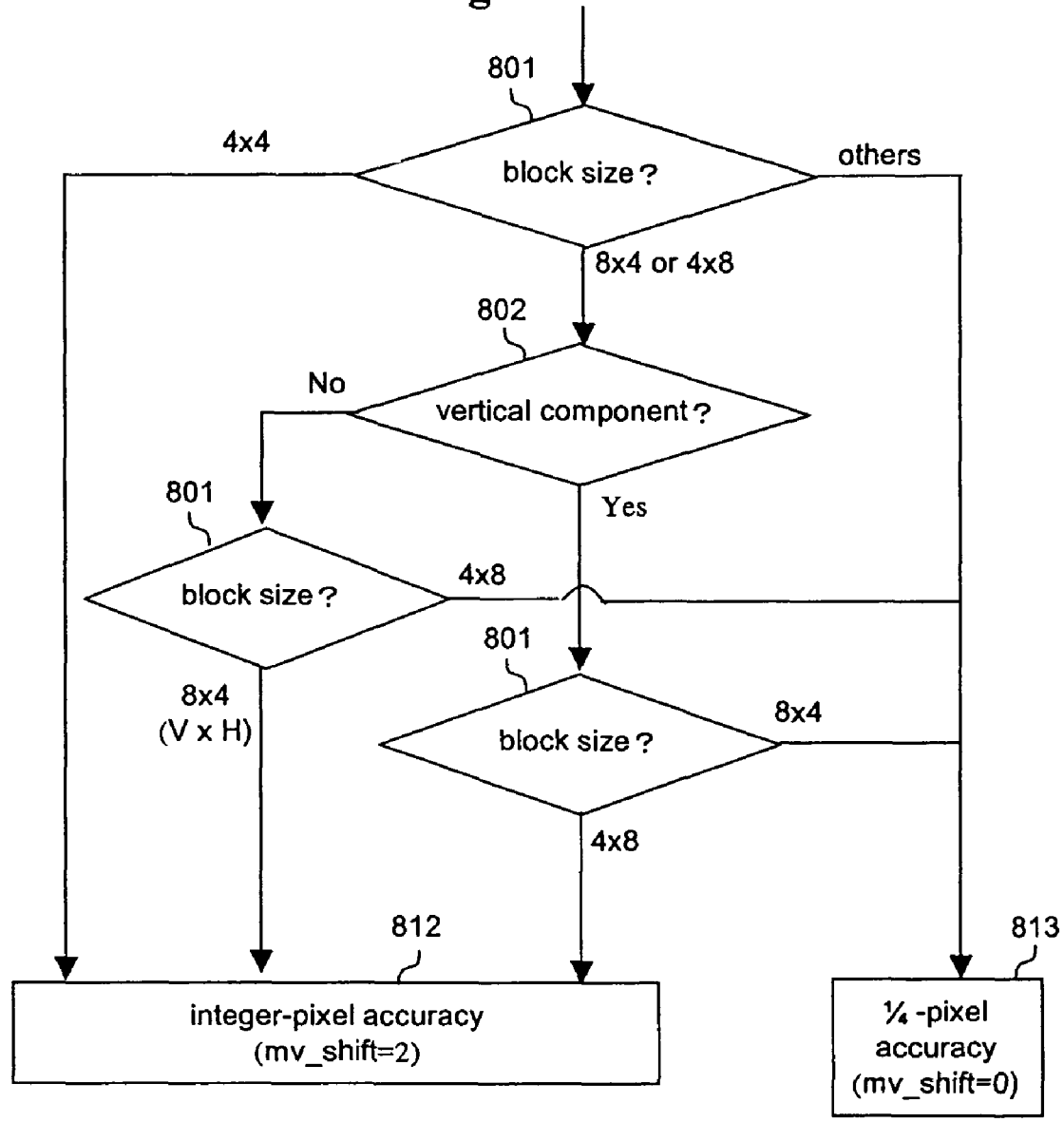
FIG. 24 shows another example of the flowchart showing the processing for switching the coding accuracy of a motion vector according to block size and a component of the motion vector in the embodiment of the invention.
Figure 43:
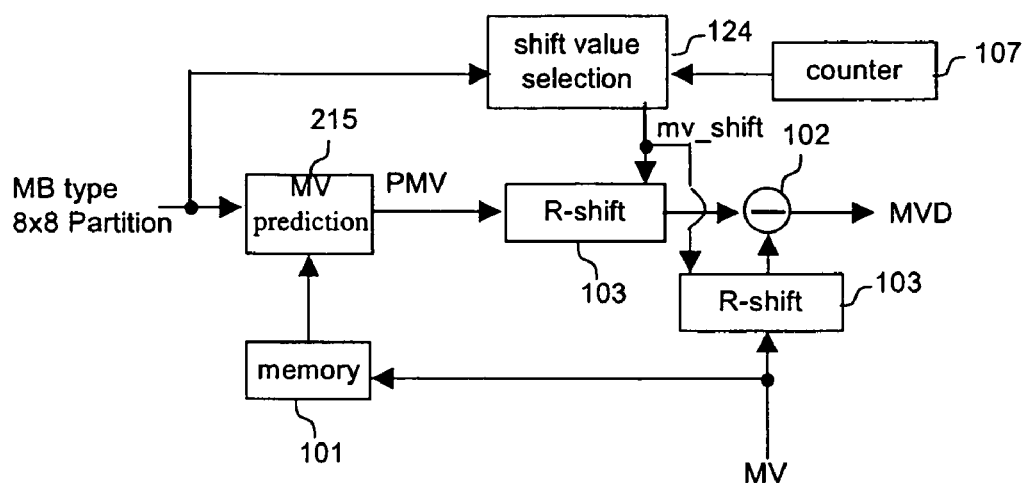
FIG. 43 is a block diagram showing an embodiment of the encoder of a motion vector of the moving picture coding apparatus according to the invention.
Figure 44:
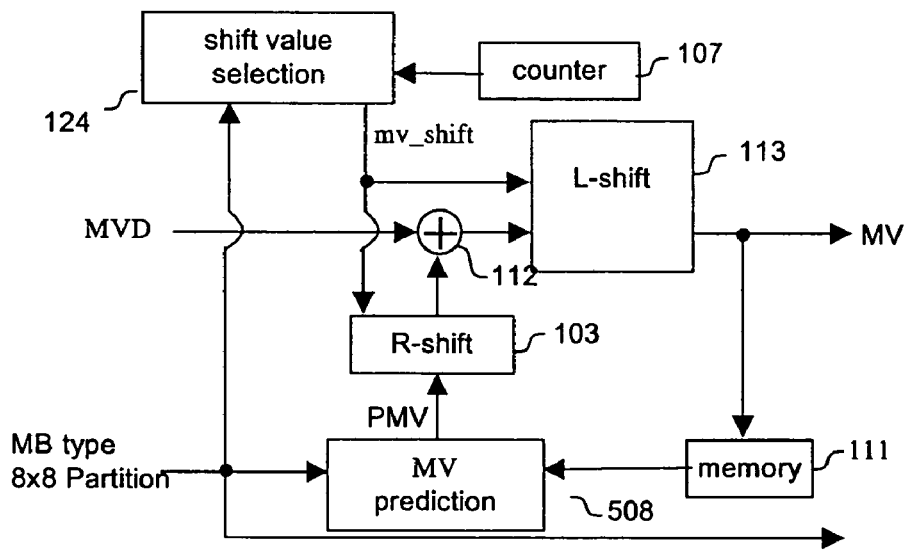
FIG. 44 is a block diagram showing an embodiment of the decoder of a motion vector of the moving picture decoding apparatus according to the invention.

FIG. 24 is a flowchart showing a coding method equivalent to a seventh embodiment of the invention, FIGS. 43 and 44 are block diagrams showing a main part of the coding apparatus and a block diagram showing a main part of the decoding apparatus.

In this embodiment, a shift value selector 124 in the coding apparatus shown in FIG. 43 and the decoding apparatus shown in FIG. 44 selects integer-pixel accuracy (mv_shift=2) for a horizontal component and selects ¼-pixel accuracy (mv_shift=0) for a vertical component respectively when block size is 8.times.4(height.times.width), selects ¼-pixel accuracy (mv_shift=0) for a horizontal component and selects integer-pixel accuracy (mv_shift=2) for a vertical component respectively when block size is 4.times.8(height-.times.width), and selects integer-pixel accuracy (mv_shift=2) for horizontal and vertical components when block size is 4.times.4(height.times.width) as shown in the flowchart shown in FIG. 24. From the viewpoint of predictive performance, the processing of horizontal and vertical components in 8.times.4 and 4.times.8 modes may be also transposed. This reason is that a high-precision predictive method is effective for a smaller component in size. It is determined depending upon the necessity of the limitation of memory access, coding performance and application such as a bit rate which method is applied.

<Eighth Embodiment>

Figure 20:
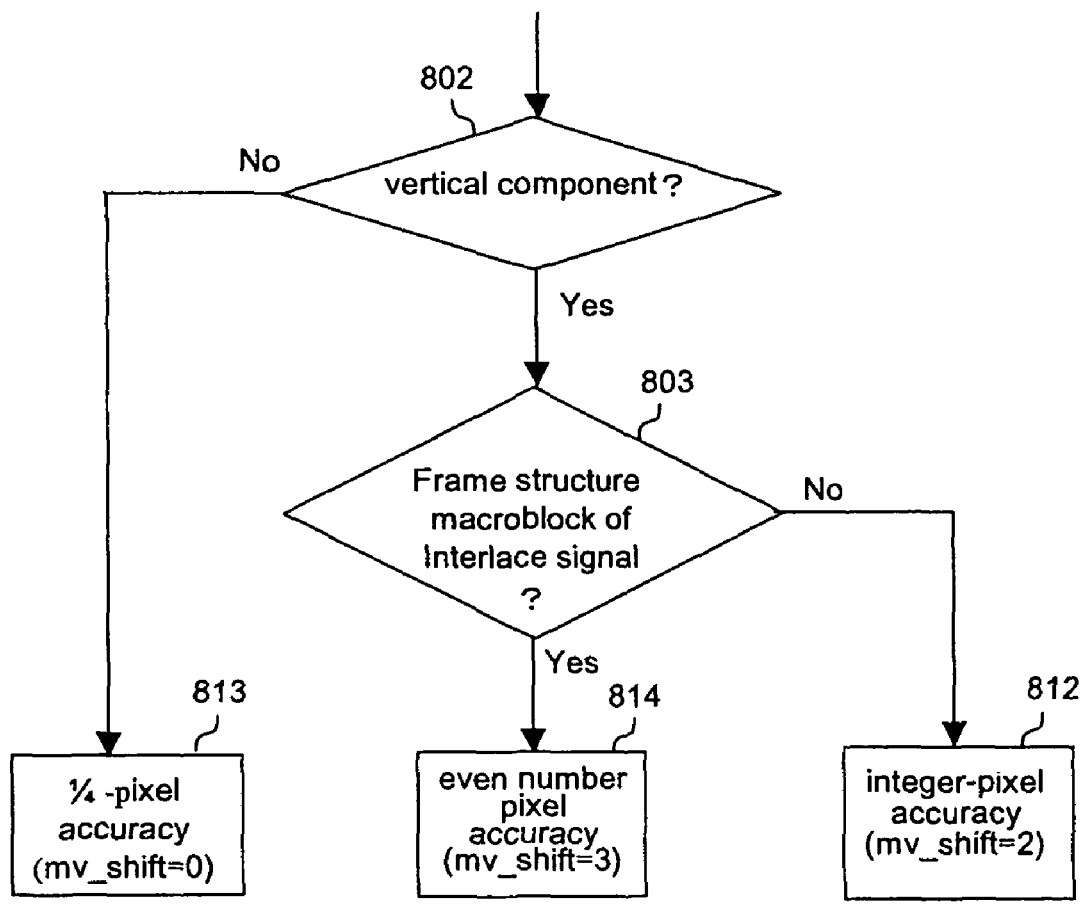
FIG. 20 is a flowchart showing processing for switching the coding accuracy of a motion vector according to a component of the motion vector and the configuration of a macroblock in the embodiment of the invention.
Figure 47:
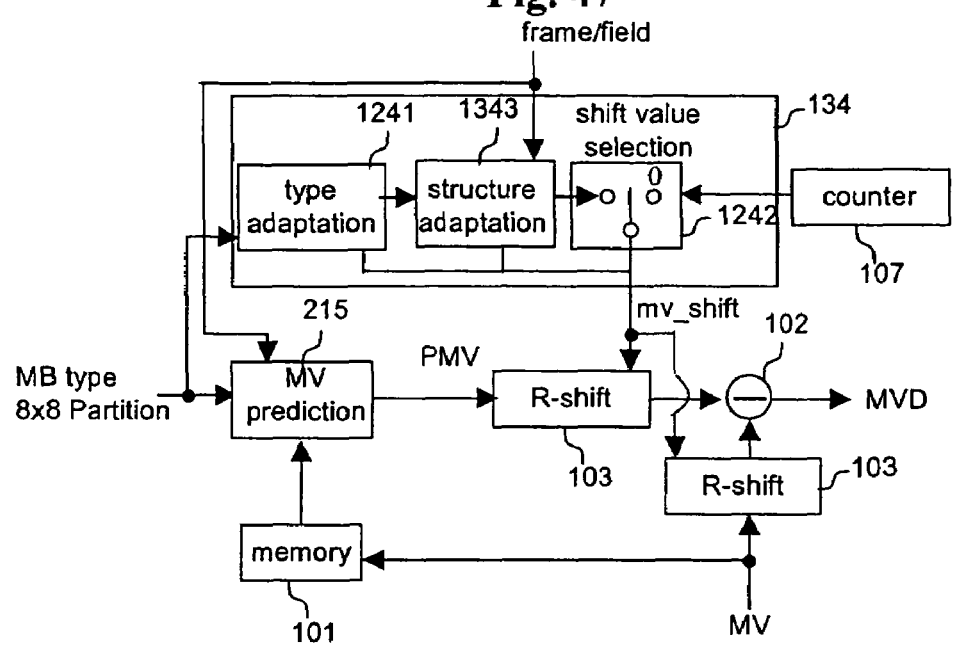
FIG. 47 is a block diagram showing an embodiment of the encoder of a motion vector of the moving picture coding apparatus according to the invention.
Figure 48:
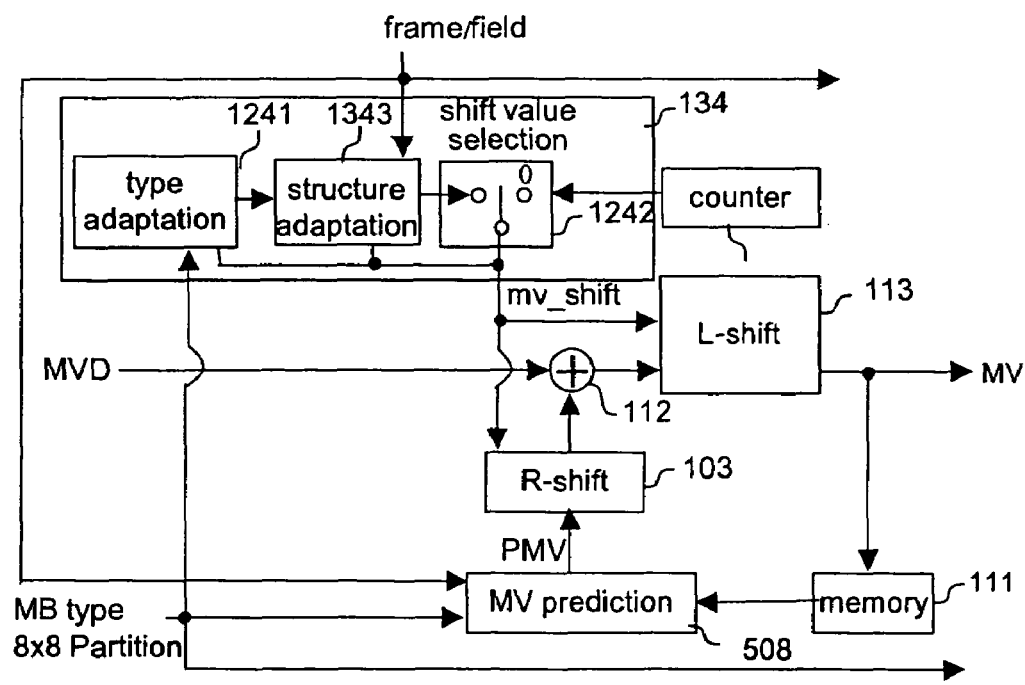
FIG. 48 is a block diagram showing an embodiment of the decoder of a motion vector of the moving picture decoding apparatus according to the invention.

FIG. 20 is a flowchart showing a coding method equivalent to an eighth embodiment of the invention, FIGS. 47 and 48 are a block diagram showing a main part of the coding apparatus and a block diagram showing a main part of the decoding apparatus. This embodiment is related to the method of limiting a vertical component of a motion vector to even number pixel accuracy in case an interlace signal is input and a macroblock has frame structure in the seventh embodiment.

FIG. 17 shows a macroblock in case the interlace signal is coded/decoded in frame structure. A full line in FIG. 17 shows an odd field (a top field) and a broken line shows an even field (a bottom field). As shown in FIG. 17, for a motion vector having an odd value, a predictive value on the odd field is generated from an even field of a reference picture and a predictive value on the even field is generated from an odd field of the reference picture. As displayed time is different between the odd field and the even field in the interlace signal, a vertical component vector having an odd value is actually not generated.

Figure 21:
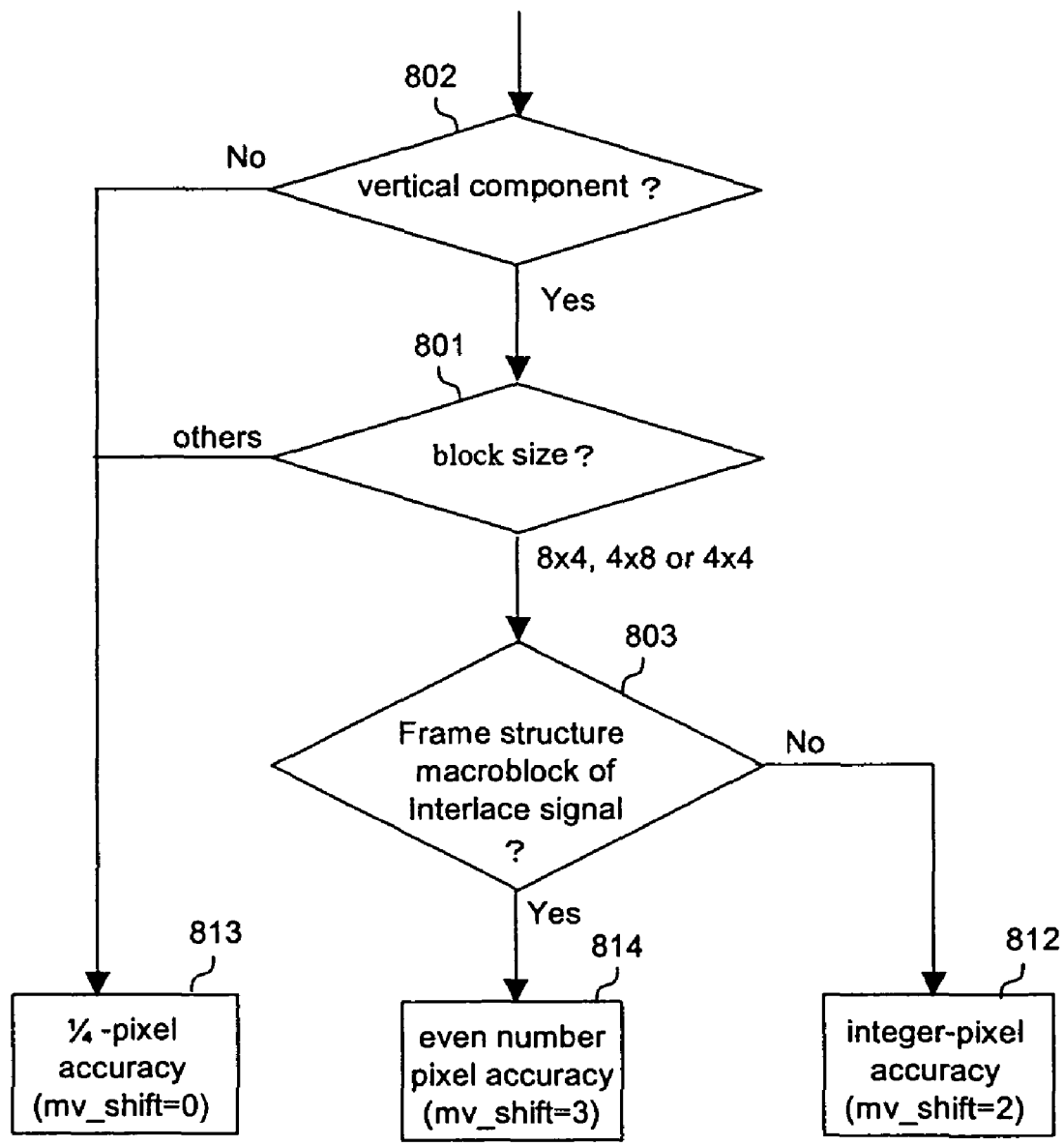
FIG. 21 is a flowchart showing processing for switching the coding accuracy of a motion vector according to block size, a component of the motion vector and the configuration of a macroblock in the embodiment of the invention.
Figure 22:
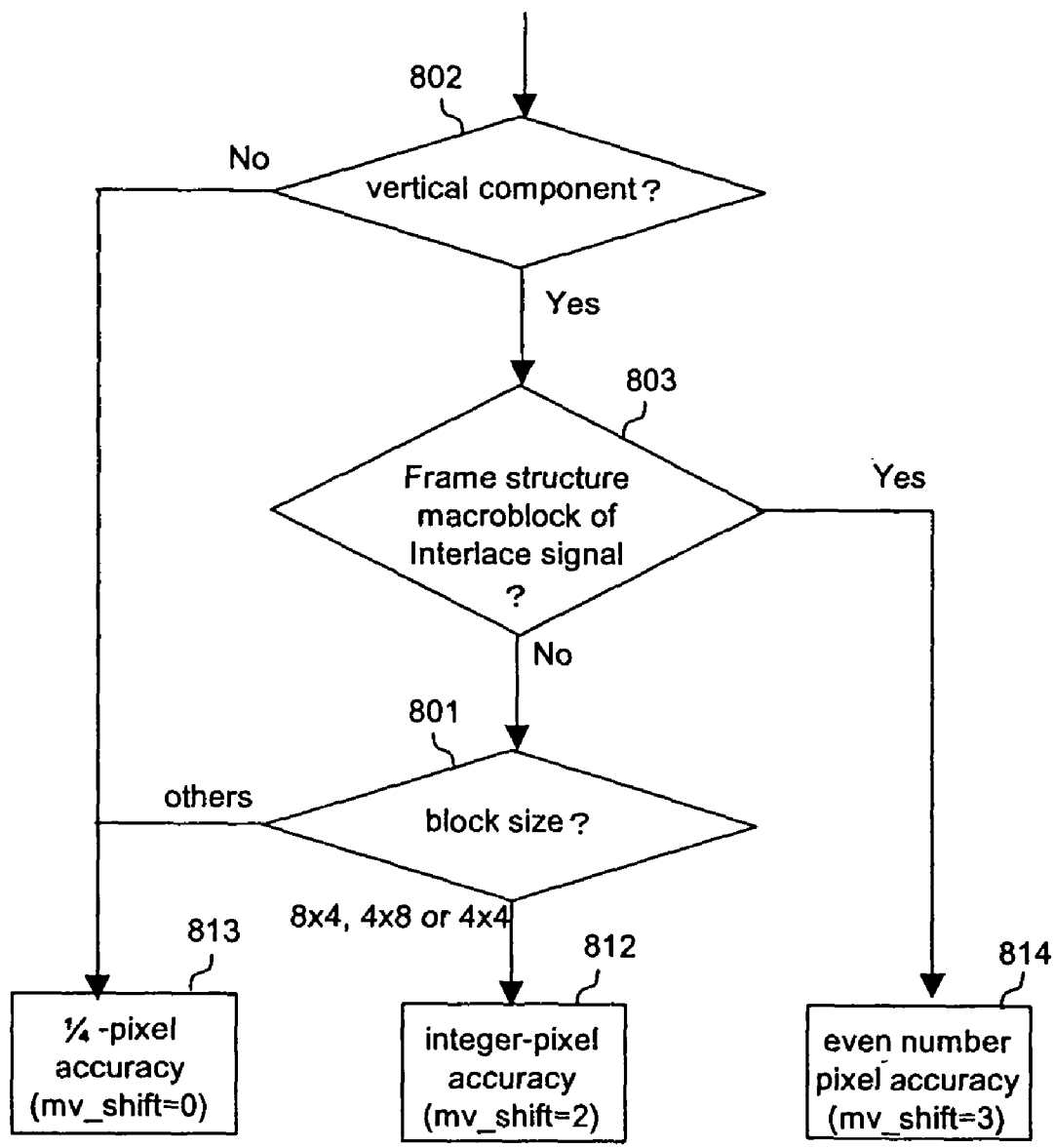
FIG. 22 shows another example of the flowchart showing the processing for switching the coding accuracy of a motion vector according to block size, a component of the motion vector and the configuration of a macroblock in the embodiment of the invention.

Then, in this embodiment, in case an interlace signal is input and a macroblock has frame structure, a vertical component of a motion vector is limited to even number pixel accuracy. In the coding/decoding apparatuses, mv_shift when a vertical component is coded/decoded is set to 3 (processes 803, 814 shown in FIG. 20) and mv_shift when a horizontal component is coded/decoded is set to 0 (the process 813 shown in FIG. 20). Also in the case of the frame structure of the interlace signal, as shown in flowcharts in FIGS. 21 and 22, a vertical component of a motion vector may be also limited to an integer pixel only in a block in 8.times.4-, 4-8- and 4.times.4-pixel size (the process 801 shown in FIG. 21) with a method in the eighth embodiment combined with the method in the seventh embodiment. Further, for the coding method of the interlace signal, there is an adaptive method of switching frame structure, field structure, and frame structure and field structure for each macroblock, and a method of selecting the coding accuracy of a motion vector may be also changed according to the method. For example, in a coding standard dealing an interlace signal and a progressive signal, a coding method of frame structure may be the same independent of a signal scan. In this case, a method that in the frame structure and the field structure, the coding accuracy of a motion vector in the vertical direction in a block in small size is limited to integer-pixel accuracy and coding/decoding is performed (the process 812 shown in FIGS. 20, 21 and 22), and in the adaptive method of switching the frame structure and the field structure for each macroblock, the coding accuracy of a motion vector in the vertical direction in a block in small size is limited to even number pixel accuracy in the frame structure (the process 814 shown in FIGS. 20 and 21), is limited to integer-pixel accuracy in the field structure and coding/decoding is performed (the process 812 shown in FIGS. 20 and 21) may be also adopted. At this time, the method may be also a method that in the frame structure, the coding accuracy of a motion vector in the vertical direction is limited to even number pixel accuracy (the process 814 shown in FIG. 22) independent of block size and in the field structure, the coding accuracy of a motion vector in the vertical direction in a block in small size is limited to integer-pixel accuracy and coding/decoding is performed (the processes 801 and 812 shown in FIG. 22).

Figure 13:
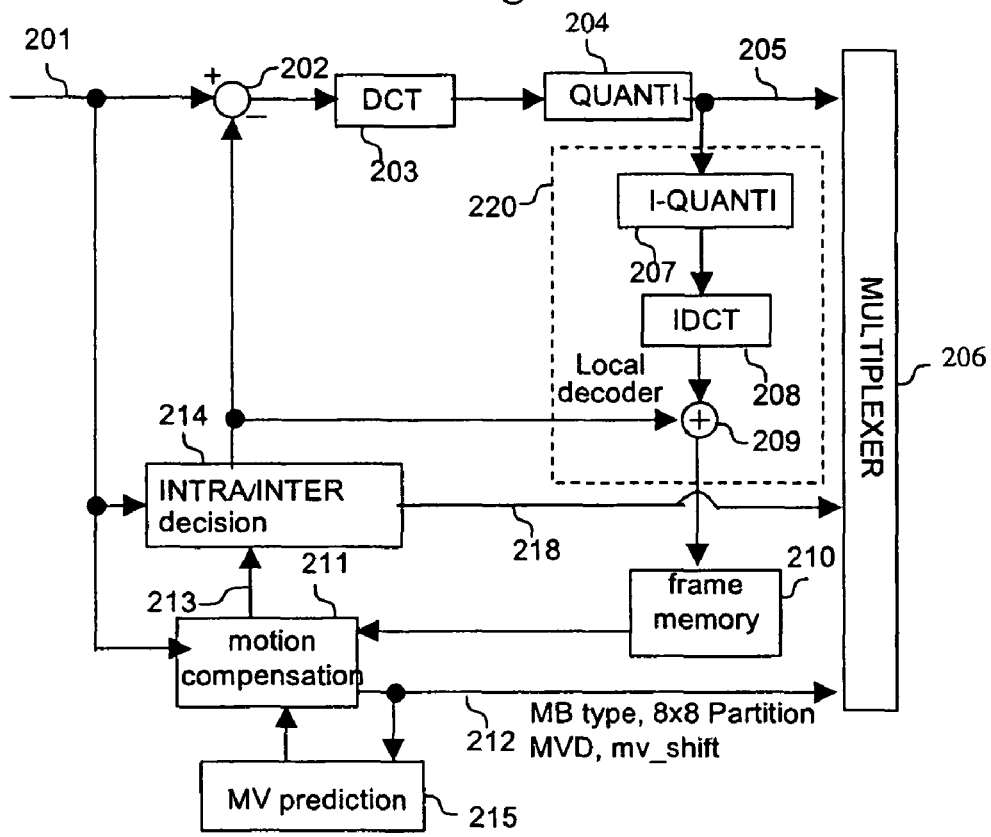
FIG. 13 is a block diagram showing the general configuration of a moving picture coding apparatus.
Figure 14:
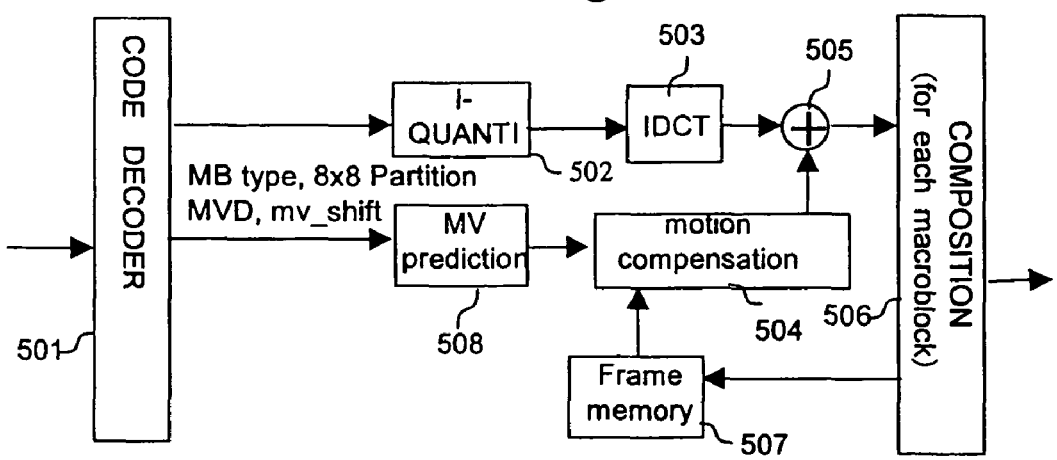
FIG. 14 is a block diagram showing the general configuration of a moving picture decoding apparatus.

In a method of reducing a memory access range in the seventh and eighth embodiments, no coding/decoding of an mv_shift value is required. Therefore, MVD Prediction 13 shown in FIGS. 1 and 2 and mv_shift in FIGS. 11 and 12 are not required. Besides, the process for transmitting the mv_shift value from the motion compensator 211 to the multiplexer 206 shown in FIG. 13 is not required. Further, the process for transmitting the mv_shift value from the code decoder 501 to the MV predictor 508 shown in FIG. 14 is not required. An mv_shift value is determined in the MV predictor 508 according to a predictive mode.

The method of reducing a memory access range in the eighth embodiment is equivalent to "limiting the coding accuracy of a motion vector to an integer pixel according to block size" and "limiting the coding accuracy of a vertical component of a motion vector to an integer pixel or an even pixel" using means for switching the accuracy of a coding motion vector and a predictive motion vector, and the accuracy of motion compensation, prepared types of motion vector coding accuracy and block size in which the coding accuracy of a motion vector is switched are not limited to the above-mentioned embodiment. In a motion compensation method in which a memory access range is reduced by limiting the accuracy of a motion vector to ½-pixel accuracy, a method of limiting a motion vector to not integer-pixel accuracy but ½-pixel accuracy can be also realized by the invention.

Industrial Availability

The invention is utilized in industrial fields requiring technology for coding picture information into a digital signal including less codes in devices and systems for transmitting, storing and displaying a moving picture.

What is claimed:

1. A method of coding a moving picture including a procedure for dividing a picture into plural coding blocks, predicting a motion vector (MV) of the coding block from a motion vector of the adjacent block to be a predictive motion vector (PMV) and coding a differential motion vector (MVD) calculated based upon the motion vector to be coded and its predictive motion vector in units of block, comprising:

a procedure for preparing some types of accuracy of the motion vector, calculating the differential motion vector (MVD) using an expression, MVD =(MV −((PMV >>mv shift) <<mv shift)) >>mv shift, or MVD =(MV >>mv shift)−(PMV >>mv shift), selecting the accuracy of a motion vector every coding block, with determining a value of the mv shift of the expression, and coding the information of the selected accuracy and a differential motion vector (MVD) calculated based upon the predictive motion vector (PMV) revised to the selected accuracy and the motion vector (MV) at the selected accuracy.

* * * * *